(12) United States Patent
Takahashi

(10) Patent No.: US 8,407,729 B2
(45) Date of Patent: Mar. 26, 2013

(54) OPTICAL DISK RECORD AND PLAYBACK APPARATUS AND PICKUP PROTECTING METHOD THEREOF

(75) Inventor: Yorio Takahashi, Ehime (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/376,812

(22) PCT Filed: Jun. 7, 2010

(86) PCT No.: PCT/JP2010/003771
§ 371 (c)(1),
(2), (4) Date: Feb. 29, 2012

(87) PCT Pub. No.: WO2010/143399
PCT Pub. Date: Dec. 16, 2010

(65) Prior Publication Data
US 2012/0151506 A1  Jun. 14, 2012

(30) Foreign Application Priority Data

Jun. 10, 2009  (JP) .................................. 2009-138924

(51) Int. Cl.
*G11B 17/03* (2006.01)
(52) U.S. Cl. ...................................................... 720/616
(58) Field of Classification Search .................. None
See application file for complete search history.

(56) References Cited

U.S. PATENT DOCUMENTS

| | | | | |
|---|---|---|---|---|
| 6,804,184 | B2 * | 10/2004 | Ahn et al. | 720/616 |
| 6,993,777 | B2 * | 1/2006 | Kabasawa | 720/626 |
| 7,113,465 | B2 * | 9/2006 | Lee | 369/53.2 |
| 2005/0102689 | A1 * | 5/2005 | Saji et al. | 720/619 |
| 2005/0117465 | A1 | 6/2005 | Kishimoto | |
| 2005/0216925 | A1 * | 9/2005 | Fujisawa et al. | 720/616 |
| 2008/0168482 | A1 * | 7/2008 | Hoshinaka et al. | 720/616 |

FOREIGN PATENT DOCUMENTS

| | | |
|---|---|---|
| JP | 11-232655 | 8/1999 |
| JP | 2001-184676 | 7/2001 |
| JP | 2005-149703 | 6/2005 |

* cited by examiner

*Primary Examiner* — Mark Blouin
(74) *Attorney, Agent, or Firm* — Dickinson Wright PLLC

(57) ABSTRACT

The present invention avoids a case in which a pickup lens and a lens protector come into contact with a structure of a disk cartridge and are damaged. When an operation distance is short and there is a disk cartridge 203 and the disk cartridge 203 is not an exclusive cartridge, a moving range of the pickup 107 is restricted or an actuating operation thereafter is stopped depending upon whether the optical disk medium 101 loaded into the optical disk apparatus is an optical disk medium having a short operation distance, whether there is a disk cartridge 203, and whether a structure of the disk cartridge 203 is prevented from coming into contact with a pickup lens or the lens protector which is exclusive for the optical disk medium having the short operation distance.

28 Claims, 9 Drawing Sheets

OPTICAL DISK RECORD AND PLAYBACK APPARATUS AND PICKUP PROTECTING METHOD THEREOF

TECHNICAL FIELD

The present invention relates to a an optical disk apparatus, and more particularly, to a technique for protecting a pickup lens and a lens protector from damage caused by contact with a structure of a disk cartridge when a disk having a short operating distance between the pickup lens and a disk surface at the time of focusing especially in a state where an optical disk medium is loaded into a cartridge.

BACKGROUND TECHNIQUE

For example, in an optical disk apparatus into which a disk-like recording medium such as a CD, a DVD and a Blu-Ray is loaded, there are an electric tray system in which the disk-like recording medium is placed on a tray and the disk-like recording medium is pulled into the apparatus by an electric motor, a direct slot-in system in which the disk-like recording medium is inserted directly into a disk insertion opening, and a slim tray system in which a disk rotating mechanism of the apparatus is pulled cut from the apparatus, and the disk-like recording medium is directly placed on a turntable by a ball-chucking. As the electric tray system, there is, in a portion of a home electrical appliance field, or an information equipment field, an electric tray system which can handle an exclusive cartridge having a shutter mechanism or which can handle a cartridge in which a medium is placed in a case, the case is placed on a tray and is loaded into the cartridge, a shutter mechanism is opened or closed by a mechanism of an apparatus, thereby operating the apparatus. As a cartridge which can be handled by a cartridge-compliant electric tray system, there are a DVD-RAM standard cartridge which is currently predominate in the market, and a BD Ver.1-exclusive cartridge which was employed in an initial. Bit-Ray disk recording apparatus. However, in recent years, a coating technique of a recording surface of a Blu-Ray disk is advanced, a bare disk is predominate, it becomes difficult to obtain this cartridge and the price thereof is high.

SUMMARY OF THE INVENTION

Problem to be Solved by the Invention

Therefore, there is an example in which a Blu-Ray disk is put into a DVD-RAM standard cartridge and is used. In the case of the Blu-Ray disk, a distance at the time of focusing between the disk and a pickup lens or a lens protector provided at a location higher than, a lens for protecting the lens is Shorter than that of a CD or a DVD such as a DVD-RAM due to optical design thereof. Hence, the Blu-Ray disk is located below a shutter mechanism of a DVD-RAM cartridge and there is fear that the Blu-Ray disk comes into contact with a bridge structure portion which is opposed to a pickup when the pickup is moved to a location in the vicinity of the disk outer periphery, and if the Blu-Ray disk comes into contact with the bridge structure portion, there is fear that an actuator coil of the pickup is damaged or the pickup lens is damaged.

Hence, it is an object of the present invention to provide an optical disk record and playback apparatus and a pickup protecting method thereof capable of preventing a case where a pickup lens and a lens protector come into contact with structure of a disk cartridge and they are damaged.

Means for Solving the Problem

According to a first aspect, there is provided an optical disk record and playback apparatus which can record or playback a plurality of kinds of optical disk media having different operation distances between a pickup lens and a disk surface at the time of focusing, and which can handle both an optical disk medium placed in a disk cartridge and an optical disk medium having no disk cartridge, wherein the optical disk record and playback apparatus includes disk loading means which loads an optical disk medium onto a disk loading portion, disk rotating means which rotates the loaded optical disk medium, a pickup which optically reads information which is recorded in the optical disk medium, pickup moving means which moves the pickup in a radial direction of the optical disk medium, disk discriminating means which discriminates kinds of optical disk media, disk cartridge detecting means which detects whether or not the optical disk medium loaded into the apparatus is placed in the disk cartridge, and restricting means which restricts a moving range of the pickup when the disk discriminating means discriminates that the optical disk medium has a short operation distance and the disk cartridge detecting means detects that the optical disk medium is placed in the disk cartridge.

According to a second aspect, there is provided an optical disk record and playback apparatus which can record or playback a plurality of kinds of optical disk media having different operation distances between a pickup lens and a disk surface at the time of focusing, and which can handle both an optical disk medium placed in a disk cartridge and an optical disk medium having no disk cartridge, wherein the optical disk record and playback apparatus includes disk loading means which loads an optical disk medium onto a disk loading portion, disk rotating means which rotates the loaded optical disk medium, a pickup which optically reads information which is recorded in the optical disk medium, pickup moving means which moves the pickup in a radial direction of the optical disk medium, disk discriminating means which discriminates kinds of optical disk media, disk cartridge, detecting means which detects whether or not the optical disk medium loaded into the apparatus is placed in the disk cartridge, and actuating operation stopping means which stops an actuating operation when the disk discriminating means discriminates that the optical disk medium has a short operation distance and the disk cartridge detecting means detects that the optical disk medium is placed in the disk cartridge.

According to a third aspect, in the optical disk record and playback apparatus of the first or second aspect, the disk cartridge is of a DVD-RAM standard, and the optical disk medium having the short operation distance is a disk of a Blu-Ray standard.

According to a fourth aspect, in the optical disk record and playback apparatus of the first aspect, the disk cartridge is of a DVD-RAM standard, and the optical disk medium having the short operation distance is a disk of a Blu-Ray standard, and the restricting means restricts the pickup not to move, to a substitute region which is allocated to an outer periphery of the optical disk medium.

According to a fifth aspect, in the optical disk record and playback apparatus of the fourth aspect, the restricting means does not seek to the substitute region but returns a playback error when a playback command is included in address data of the substitute region.

According to a sixth aspect, in the optical disk record and playback apparatus of the fourth aspect, by instructions from the restricting means, a formatting operation is carried out such that a range where movement of the pickup is restricted is included in the substitute region.

According to a seventh aspect, there is provided an optical disk record and playback apparatus which can record or playback a plurality of kinds of optical disk media having different operation distances between a pickup lens and a disk surface at the time of focusing, and which can handle both an optical disk medium placed in a disk cartridge and an optical disk medium having no disk cartridge, wherein the optical disk record and playback apparatus includes disk loading means which loads an optical disk medium onto a disk loading portion, disk rotating means which rotates the loaded optical disk medium, a pickup which optically reads information which is recorded in the optical disk medium, pickup moving means which moves the pickup in a radial direction of the optical disk medium, disk discriminating means which discriminates kinds of optical disk media, disk cartridge detecting means which detects whether or not the optical disk medium loaded into the apparatus is placed in the disk cartridge, cartridge distinguishing means which distinguishes whether the disk cartridge is a normal cartridge with which the pickup lens or the lens protector possibly comes into contact at the time of focusing on the optical disk medium having a short operation distance, or the disk cartridge is an exclusive cartridge whose shape is changed so such that the pickup lens or the lens protector does not come into contact with the exclusive cartridge at the time of focusing on the optical disk medium having the short operation distance, and restricting means which restricts a moving range of the pickup when the disk discriminating means discriminates that the optical disk medium has the short operation distance and the disk cartridge detecting means detects that the optical disk medium is placed in the disk cartridge and the cartridge distinguishing means distinguishes that the disk cartridge is the normal cartridge.

According to an eighth aspect, there is provided an optical disk record and playback apparatus which can record or playback a plurality of kinds of optical disk media having different operation distances between a pickup lens and a disk surface at the time of focusing, and which can handle both an optical disk medium placed in a disk cartridge and an optical disk medium having no disk cartridge, wherein the optical disk record and playback apparatus includes disk loading means which loads an optical disk medium onto a disk loading portion, disk rotating means which rotates the loaded optical disk medium, a pickup which optically reads information which is recorded in the optical disk medium, pickup moving means which moves the pickup in a radial direction of the optical disk medium, disk discriminating means which discriminates kinds of optical disk media, disk cartridge detecting means which detects whether or not the optical disk medium loaded into the apparatus is placed in the disk cartridge, cartridge distinguishing means which distinguishes whether the disk cartridge is a normal cartridge with, which the pickup lens or the lens protector possibly comes into contact at the time of focusing on the optical disk medium having a short operation distance, or the disk cartridge is an exclusive cartridge whose shape is changed so such that the pickup lens or the lens protector does not come into contact with the exclusive cartridge at the time of focusing on the optical disk medium having the short operation distance, and actuating operation stopping means which stops an actuating operation when the disk discriminating means discriminates that the optical disk medium has the short operation distance and the disk cartridge detecting means detects that the optical disk medium is placed in the disk cartridge and the cartridge distinguishing means distinguishes that the disk cartridge, is the normal cartridge.

According to a ninth aspect, in the optical disk record and playback apparatus of the seventh or eighth aspect, the exclusive cartridge includes an exclusive cartridge detecting hole, and the cartridge distinguishing means distinguishes between the exclusive cartridge and the normal cartridge based on presence or absence of the exclusive cartridge detecting hole.

According to a tenth aspect, in the optical disk record and playback apparatus of the seventh or eighth aspect, the cartridge distinguishing means reacts distinguishing information which is recorded in a BCA (Burst Cut Area) of the optical disk medium and distinguishing information which is recorded in a PCA (Power Calibration Area) of the optical disk medium, and distinguishes between the exclusive cartridge and the normal cartridge.

According to an eleventh aspect, in the optical disk record and playback apparatus of the tenth aspect, the distinguishing information includes information in which a distinguishing character string indicative of model information of a recording apparatus which records in the optical disk medium is changed to a character string which is different from a normal character string.

According to a twelfth aspect, in the optical disk record and playback apparatus of the seventh or eighth aspect, wherein the disk cartridge is of DVD-RAM standard, and the optical disk medium having the short operation distance is a disk of a Blu-Ray standard.

According to a thirteenth aspect, in the optical disk record and playback apparatus of the seventh aspect, the disk cartridge is of a DVD-RAM standard, and the optical disk medium having the short operation distance is a disk of a Blu-Ray standard, and the restricting means restricts the pickup not to move to a substitute region which, is allocated to an outer periphery of the optical disk medium.

According to a fourteenth aspect, in the optical disk record and playback apparatus of the thirteenth aspect, by instructions from the restricting means, a formatting operation is carried out such that a range where movement of the pickup is restricted is included in the substitute region.

According to a fifteenth aspect, there is provided a pickup protecting method of an optical disk record and playback apparatus which can record or playback a plurality of kinds of optical disk media having different operation distances between a pickup lens and a disk surface at the time, of focusing, and which can handle both an optical disk medium placed in a disk cartridge and an optical disk medium having no disk cartridge, the method comprising a step of loading the optical disk medium onto a disk loading portion, a step of rotating the loaded optical disk medium, a step of discriminating kinds of the optical disk media, a step of detecting whether or not the optical disk medium loaded into the apparatus is placed in the disk cartridge, and a step of restricting a moving range of a pickup which optically reads information which is recorded in the optical disk medium when it is discriminated that the optical disk medium has a short operation distance and it is detected that the optical disk medium is placed in the disk cartridge.

According to a sixteenth aspect, there is provided a pickup protecting method of an optical disk record and playback apparatus which can record or playback a plurality of kinds of optical disk media having different operation distances between a pickup lens and a disk surface at the time of focusing, and which can handle both an optical disk Medium placed in a disk cartridge and an optical disk medium having no disk cartridge, the method comprising a step of loading the optical disk medium onto a disk loading portion, a step of rotating the loaded optical disk medium, a step of discriminating kinds of the optical disk media, a step of detecting whether or not the optical disk medium loaded into the apparatus is placed in the disk cartridge, and a step of stopping an actuating operation when it is discriminated that the optical disk medium has a short operation distance and it is detected that the optical disk medium is placed in the disk cartridge.

According to a seventeenth aspect, in the optical disk record and playback apparatus of the fifteenth or sixteenth aspect, the disk cartridge is of a DVD-RAM standard, and the optical disk medium having the short operation distance is a disk of a Blu-Ray standard.

According to an eighteenth aspect, in the optical disk record and playback apparatus of the fifteenth aspect, the disk cartridge is of a DVD-RAM standard, and the optical disk medium having the short operation distance is a disk of a Blu-Ray standard, and the method further comprises a step of restricting the pickup not to move to a substitute region which is allocated to an outer periphery of the optical disk medium.

According to a nineteenth aspect, in the optical disk record and playback apparatus of the eighteenth aspect, the method further comprises a step of not seeking the substitute region and but returning a playback error when a playback command is included in address data of the substitute region.

According to a twentieth aspect, in the optical disk record and playback apparatus of the eighteenth aspect, the method further comprises a step of carrying out a formatting operation such that a range where movement of the pickup is restricted is included in the substitute region.

According to a twenty-first aspect, there is provided a pickup protecting method of an optical disk record and playback apparatus which can record or playback a plurality of kinds of optical disk media having different operation distances between a pickup lens and a disk surface at the time of focusing, and which can handle both an optical disk medium placed in a disk cartridge and an optical disk medium having no disk cartridge, the method comprising a step of loading the optical disk medium onto a disk loading portion, a step of rotating the loaded optical disk medium, a step of discriminating kinds of the optical disk media, a step of detecting whether or not the optical disk medium loaded into the apparatus is placed in the disk cartridge, a step of distinguishing whether the disk cartridge is a normal cartridge with which the pickup lens or the lens protector possibly comes into contact at the time of focusing on the optical disk medium having a short operation distance, or the disk cartridge is an exclusive cartridge whose shape is changed so such that the pickup lens or the lens protector does not come into contact with the exclusive cartridge at the time of focusing on the optical disk medium having the short operation distance, and a step of restricting a moving range of a pickup which optically reads information which is recorded in the optical disk medium when it is discriminated that the optical disk medium has the short operation distance and it is detected that the optical disk medium is placed in the disk cartridge.

According to a twenty-second aspect, there is provided a pickup protecting method of an optical disk record and playback apparatus which can record or playback a plurality of kinds of optical disk media having different operation distances between a pickup lens and a disk surface at the time of focusing, and which can handle both an optical disk medium placed in a disk cartridge and an Optical disk medium having no disk cartridge, the method comprising a step of loading the optical disk medium onto a disk loading portion, a step of rotating the loaded optical disk medium, a step of discriminating kinds of the optical disk media, a step of detecting whether or not the optical disk medium loaded into the apparatus is placed in the disk cartridge, a step of distinguishing whether the disk cartridge is a normal cartridge with which the pickup lens or the lens protector possibly comes into contact at the time of focusing on the optical disk medium having a short operation distance, or the disk cartridge is an exclusive cartridge whose shape is changed so such that the pickup lens or the lens protector does not come into contact with the exclusive cartridge at the time of focusing on the optical disk medium having the short operation distance, and a step of stopping an actuating operation when it is discriminated that the optical disk medium has the short operation distance and it is detected that the optical disk medium is placed in the disk cartridge and it is distinguished that the disk cartridge is a normal cartridge.

According to a twenty-third aspect, in the optical disk record and playback apparatus of the twenty-first or twenty-second aspect, the exclusive cartridge includes an exclusive cartridge detecting hole, and the method further comprises a step of distinguishing between the exclusive cartridge and the normal cartridge based on presence or absence of the exclusive cartridge detecting hole by the cartridge distinguishing means.

According to a twenty-fourth aspect, in the optical disk record and playback apparatus of the twenty-first or twenty-second aspect, the method further comprises a step of reading distinguishing information which is recorded in a BCA (Burst Cut Area) of the optical disk medium and distinguishing information which is recorded in a PCA (Power Calibration Area) of the optical disk medium, and distinguishing between the exclusive cartridge and the normal cartridge by the cartridge distinguishing means.

According to a twenty-fifth aspect, in the optical disk record and playback apparatus of the twenty-fourth aspect, the distinguishing information includes information in which a distinguishing character string indicative of model information of a recording apparatus which records in the optical disk medium is changed to a character string which is different from a normal character string.

According to a twenty-sixth aspect, in the optical disk record and playback apparatus of the twenty-first or twenty-second aspect, the disk cartridge is of a DVD-RAM standard, and the optical disk medium having the short operation distance is a disk of a Blu-Ray standard.

According to a twenty-seventh aspect, in the optical disk record and playback apparatus of the twenty-first aspect, the disk cartridge is of a DVD-RAM standard, and the optical disk medium having the short operation distance is a disk of a Blu-Ray standard, and in the step of restricting the moving range of the pickup, the pickup is restricted not to move to a substitute region which is allocated to an outer periphery of the optical disk medium.

According to a twenty-eighth aspect, in the optical disk record and playback apparatus of the twenty-seventh aspect, a formatting operation is carried out such that a range where movement of the pickup is restricted is included in the substitute region.

Effect of the Invention

According to the present invention, it is possible to provide an optical disk record and playback apparatus and a pickup protecting method thereof capable of preventing a pickup lens, a lens base and a lens protector from coming into contact with a structure of a disk cartridge and preventing a pickup from being damaged.

Figure 1:
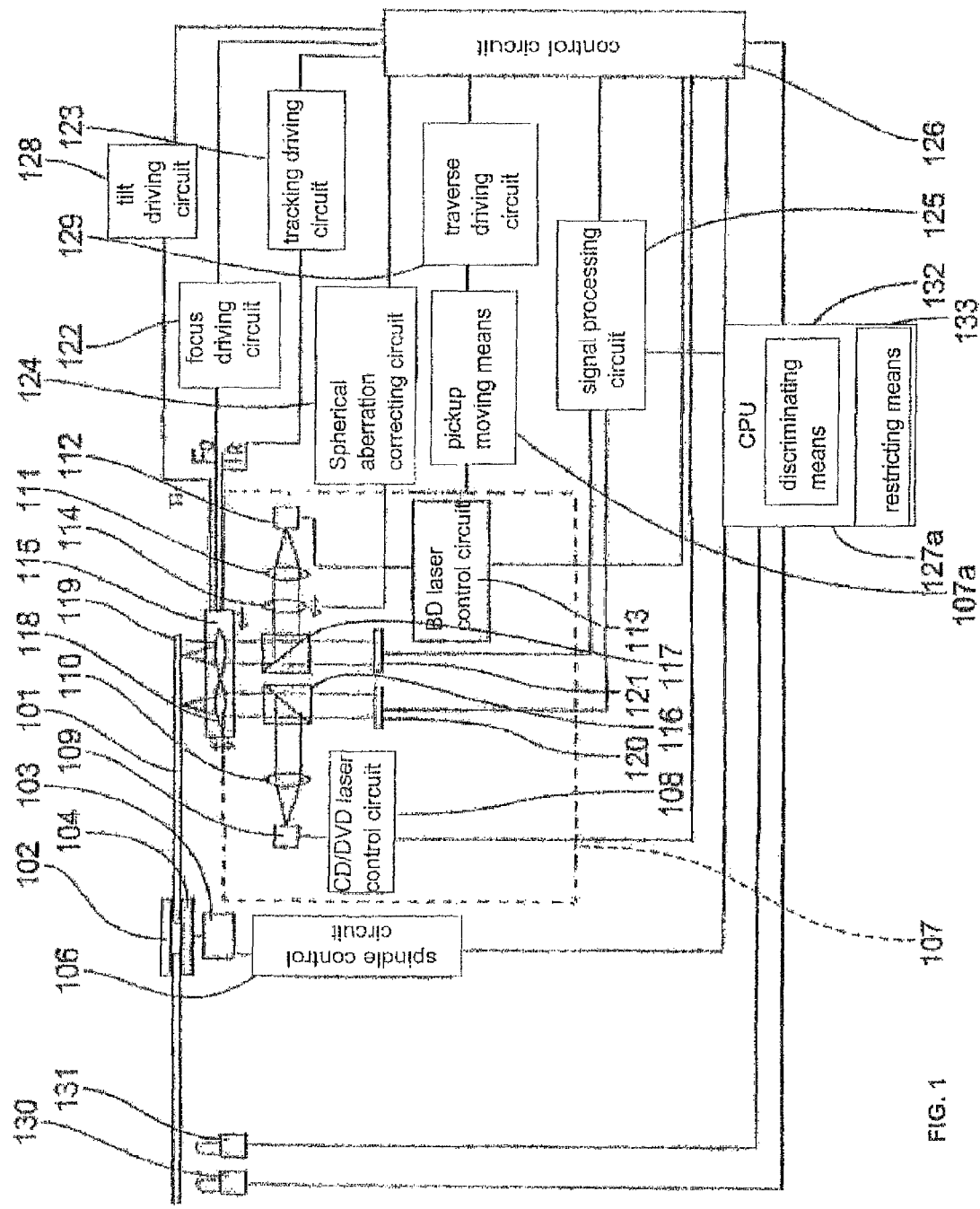
FIG. 1 is a block diagram showing an optical disk record and playback apparatus according to an embodiment of the present invention expressed by means of function realizing means.

EXPLANATION OF SYMBOLS 101 optical disk medium
102 disk loading means
103 disk rotating means (spindle motor)
104 turntable
106 spindle control circuit
107 pickup 107a pickup moving means
108 CD/DVD laser control circuit
109 CD/DVD dual wavelength laser diode
110 CD/DVD coupling lens
111 BD coupling lens
112 BD laser diode
113 BD laser control circuit
114 BD spherical aberration: correcting lens
115 lens rack
116 CD/DVD half mirror
117 BD half mirror
118 CD/DVD objective lens
119 BD objective lens
120 CD/DVD light receiving element
121 BD light receiving element
122 focus driving circuit
123 tracking driving circuit
124 spherical aberration correcting circuit
125 signal processing circuit
126 control circuit
127a, 127b CPU
128 tilt driving circuit
129 traverse driving circuit
130 disk cartridge detecting means
131 cartridge distinguishing means
132 disk discriminating means
133 restricting means
134 actuating operation stopping means
201 optical disk record and playback apparatus
202 tray
203 disk cartridge
204 shutter
501 bridge structure
502 lens protector
701 bridge structure

MODE FOR CARRYING OUT THE INVENTION

According to the first aspect of the invention, the optical disk record and playback apparatus includes disk loading means which loads an optical disk medium onto a disk loading portion, disk rotating means which rotates the loaded optical disk medium, a pickup which optically reads information which is recorded in the optical disk medium, pickup moving means which moves the pickup in a radial direction of the optical disk medium, disk discriminating means which discriminates kinds of optical disk media, disk cartridge, detecting means which detects whether or not the optical disk medium loaded into the apparatus is placed in the disk cartridge, and restricting means which restricts a moving range of the pickup when the disk discriminating means discriminates that the optical disk medium has a short operation distance and the disk cartridge detecting means detects that the optical disk medium is placed in the disk cartridge. According to this aspect, when the disk discriminating means discriminates that the disk has the short operation distance and it is detected that the disk is in the disk cartridge, the moving range of the pickup is limited. Therefore, it is possible to prevent the pickup lens, the lens base and the lens protector from coming into contact with the structure of the disk cartridge and to prevent the pickup from being damaged.

According to the second aspect of the invention, the optical disk record and playback apparatus includes disk loading means which loads an optical disk medium onto a disk loading portion, disk rotating means which rotates the loaded optical disk medium, a pickup which optically reads information which is recorded in the optical disk medium, pickup moving means which moves the pickup in a radial direction of the optical disk medium, disk discriminating means which discriminates kinds of optical disk media, disk cartridge detecting means which detects whether or not the optical disk medium loaded into the apparatus is placed in the disk cartridge, and actuating operation stopping means which stops an actuating operation when the disk discriminating means discriminates that the optical disk medium has a short operation distance and the disk cartridge detecting means detects that the optical, disk medium placed in the disk cartridge. According to this aspect, when the disk discriminating means discriminates that the disk has the short operation distance and it is detected that the disk is in the disk cartridge, it is determined that the disk does not correspond to the disk cartridge, and the actuating operation is stopped. Therefore, it is possible to prevent the pickup lane, the lens base and the lens protector from coming into contact with the structure of the disk cartridge and to prevent the pickup from being damaged.

According to the third aspect of the invention, in the optical disk record and playback apparatus of the first or second aspect, the disk cartridge is of a DVD-RAM standard, and the optical disk medium having the short operation distance is a disk of a Blu-Ray standard, According to this aspect, even when a disk of the Blu-Ray standard is placed into a cartridge of the DVD-RAM standard, it is possible to prevent the pickup lens, the lens base and the lens protector from coming into Contact with the structure of the disk cartridge and to prevent the pickup from being damaged.

According to the fourth aspect of the invention, in the optical disk record and playback apparatus of the first aspect, the disk cartridge is of a DVD-RAM standard, and the optical disk medium having the short operation distance is a disk of a Blu-Ray standard, and the restricting means restricts the pickup not to move to a substitute region which is allocated to an outer periphery of the optical disk medium. According to this aspect, even when a disk of a Blu-Ray standard is placed in a cartridge of a DVD-RAM standard and the apparatus is operated, the disk discriminating means discriminates that the disk is of the Blu-Ray standard having the short operation distance, and when it is detected that the disk is in a disk cartridge of the DVD-RAM standard, the moving range of the pickup is restricted, so that the pickup does not move to the substitute region which is allocated to the outer periphery of the optical disk medium. Therefore, it is possible to prevent the pickup lens, the lens base and the lens protector from coming into contact with the structure of the disk cartridge and to prevent the pickup from being damaged.

According to the fifth aspect of the invention, in the optical disk record and playback apparatus of the fourth aspect, the restricting means does not seek to the substitute region but returns a playback error when a playback command is included in address data of the substitute region. According to this aspect, even when a disk of a Blu-Ray standard is placed in a cartridge of a DVD-RAM standard and the apparatus is operated, the disk discriminating means discriminates that the disk is of the Blu-Ray standard having the short operation distance, and when it is detected that the disk is in a disk cartridge of the DVD-RAM standard, if a playback command exists in data of an address where a registered substitute region is in the vicinity of the outer periphery of the disk, the substitute region in the vicinity of the outer periphery is not sought and the playback error is immediately be returned. Therefore, it is possible to prevent the pickup lens, the lens base and the lens protector from coming into contact with the structure of the disk cartridge and to prevent the pickup from being damaged.

According to the sixth aspect of the invention, in the optical disk record and playback apparatus of the fourth aspect, by instructions from the restricting means, a formatting, operation is carried out such that a range where movement of the pickup is restricted is included in the substitute region. According to this aspect, even when a disk of the Blu-Ray standard is placed in a cartridge of the DVD-RAM standard and the apparatus is operated, the disk discriminating means discriminates that the disk is of the Blu-Ray standard having the short operation distance, and the formatting operation when it is detected that the disk cartridge is of the DVD-RAM standard is carried out such that a region including a range in the vicinity of the outer periphery of the disk where the pickup lens or the lens protector possibly collides against the disk cartridge of the DVD-RAM standard becomes the substitute region, and the moving range of the pickup is restricted so that the pickup does not move to the substitute region which is allocated to the outer periphery of the optical disk medium. Therefore, it is possible to prevent the pickup lens, the lens base and the lens protector from coming into contact with the structure of the disk cartridge and to prevent the pickup from being damaged.

According to the seventh aspect of the invention, the optical disk record and playback apparatus includes disk loading means which loads an optical disk medium onto a disk loading portion, disk rotating means which rotates the loaded optical disk medium, a pickup which optically reads information which is recorded in the optical disk medium, pickup moving means which moves the pickup in a radial direction of the optical disk medium, disk discriminating means which discriminates, kinds of optical disk media, disk cartridge detecting means which detects whether or not the optical disk medium loaded into the apparatus is placed in the disk cartridge, cartridge distinguishing means which distinguishes whether the disk cartridge is a normal cartridge with which the pickup lens or the lens protector possibly comes into contact at the time of focusing on the optical disk medium having a short operation distance, or the disk cartridge is an exclusive cartridge whose shape is changed so such that the pickup lens or the lens protector does not come into contact with the exclusive cartridge at the time of focusing on the optical disk medium having the short operation distance, and restricting means which restricts a moving range of the pickup when the disk discriminating means discriminates that the optical disk medium has the short operation distance and the disk cartridge detecting means detects that the optical disk medium is placed in the disk cartridge and the cartridge distinguishing means distinguishes that the disk cartridge is the normal cartridge. According to this aspect, when it is determined that the disk has the short operation distance from a result of determination of the disk discriminating means and the disk cartridge detecting means detects that the disk is in a disk cartridge and the cartridge distinguishing means distinguishes that the disk cartridge is a normal cartridge with which the pickup lens or the lens protector possibly comes into contact at the time of focusing on the disk having the short operation distance, the moving range of the pickup moving means is restricted. Therefore, it is possible to prevent the pickup lens, the lens base and the lens protector from coming into contact with the structure of the disk cartridge and to prevent the pickup from being damaged.

According to the eighth aspect of the invention, the optical disk record and playback apparatus includes disk loading means which loads an optical disk medium onto a disk loading portion, disk rotating means which rotates the loaded optical disk medium, a pickup which optically reads information which is recorded in the optical disk medium, pickup moving means which moves the pickup in a radial direction of the optical disk medium, disk discriminating means which discriminates kinds of optical disk media, disk cartridge detecting means which detects whether or not the optical disk medium loaded into the apparatus is placed in the disk cartridge, cartridge distinguishing means which distinguishes whether the disk cartridge is a normal cartridge with which the pickup lens or the lens protector possibly comes into contact at the time of focusing on the optical disk medium having a short operation distance, or the disk cartridge is an exclusive cartridge whose shape is changed so such that the pickup lens or the lens protector does not come into contact with the exclusive cartridge at the time of focusing on the optical disk medium having the short operation distance, and actuating operation stopping means which stops an actuating operation when the disk discriminating means discriminates that the optical disk medium has the short operation distance and the disk cartridge detecting means detects that the optical disk medium is placed in the disk cartridge and the cartridge distinguishing means distinguishes that the disk cartridge is the normal cartridge. According to this aspect, when it is determined that the disk has the short operation distance from a result of determination of the disk discriminating means and the disk cartridge detecting means detects that the disk is in a disk cartridge and the cartridge distinguishing means distinguishes that the disk cartridge is a normal cartridge with which the pickup lens or the lens protector possibly comes into contact at the time of focusing on the disk having the short operation distance, it is determined that the disk does not correspond to the disk cartridge, and the actuating operation is stopped. Therefore, it is possible to prevent the pickup lens, the lens base and the lens protector from coming into contact with the structure of the disk cartridge and to prevent the pickup from being damaged.

According to the ninth aspect of the invention, in the optical disk record and playback apparatus of the seventh or eighth aspect, the exclusive cartridge includes an exclusive cartridge detecting hole, and the cartridge distinguishing means distinguishes between the exclusive cartridge and the normal cartridge based on presence or absence of the exclusive cartridge detecting hole. According to this aspect, the cartridge distinguishing means distinguishes that a shape of a cartridge is changed when information is the exclusive disk distinguishing information and a disk is in a disk cartridge from presence or absence of cartridge-exclusive disk distinguishing information of shape change recorded in an optical disk medium placed in the disk cartridge, and when there is no exclusive disk distinguishing information and the disk is in the disk cartridge, the cartridge distinguishing means distinguishes that the disk cartridge is a normal cartridge. Therefore, it is possible to prevent the pickup lens, the lens base and the lens protector from coming into contact with the structure of the disk cartridge and to prevent the pickup from being damaged.

According to the tenth aspect of the invention, in the optical disk record and playback apparatus of the seven or eighth aspect, the cartridge distinguishing means reads distinguishing information which is recorded in a BCA (Burst Cut Area) of the Optical disk medium and distinguishing information which is recorded in a PCA (Power Calibration Area) Of the optical disk medium, and distinguishes between the exclusive cartridge and the normal cartridge. According to this aspect, the exclusive disk distinguishing information includes the distinguishing character string included in the BCA information forted in the optical disk medium. Therefore, it is possible to prevent the pickup lens, the lens base and the lens protector from coming into contact with the structure of the disk cartridge and to prevent the pickup from being damaged.

According to the eleventh aspect of the invention, in the optical disk record and playback apparatus of the tenth aspect, the distinguishing information includes information in which, a distinguishing character string indicative of model information of a recording apparatus which records in the optical disk medium is changed to a character string which is different from a normal character string. According to this aspect, the exclusive disk distinguishing information includes information in which the distinguishing character string indicative of model information of the recording apparatus which records in the disk is changed to a character string which is different from a normal character string. Therefore, it is possible to prevent the pickup lens, the lens base and the lens protector from coming into contact with the structure of the disk cartridge and to prevent the pickup from being damaged.

According to the twelfth aspect of the, invention, in the optical, disk record and playback apparatus of the seventh or eighth aspect, the disk cartridge is of a DVD-RAM standard, and the optical disk medium having the short operation distance is a disk of a Blu-Ray standard. According to this aspect, even if a disk of the Blu-Ray standard is placed in a cartridge of the DVD-RAM standard and the apparatus is operated, it is possible to prevent the pickup lens, the lens base and the lens protector from coming into contact with the structure of the disk cartridge and to prevent, the pickup from being damaged.

According to the thirteenth aspect of the invention, in the optical disk record and playback apparatus of the seventh aspect, the disk cartridge is of a DVD-RAM standard, and the optical disk medium having the short operation distance is a disk of a Blu-Ray standard, and the restricting means restricts the pickup not to move to a substitute region, which is allocated to an outer periphery of the optical disk medium. According to this aspect, even when a disk of the Blu-Ray standard is placed in a cartridge of the DVD-RAM standard and the apparatus is operated, if it is determined that the disk has a short operation distance and the disk cartridge detecting means detects that the disk is in a disk cartridge and it is determined that the disk cartridge, is a normal cartridge with which a pickup lens or a lens protector possibly comes into contact at the time of focusing on the disk having the short operation distance from a result of determination of the disk discriminating means, the moving range of the pickup moving means is restricted so that the pickup does not move to the Substitute region which is allocated to the outer periphery of the disk of the Blu-Ray standard. Therefore, it is possible to prevent the pickup lens, the lens base and the lens protector from coming into contact with the structure of the disk cartridge and to prevent the pickup from being damaged.

According to the fourteenth aspect of the invention, in the optical disk record and playback apparatus of the thirteenth aspect, by instructions from the restricting means, a formatting operation is carried out such that a range where movement of the pickup is restricted is included in the substitute region. According to this aspect, even when a disk of the Blu-Ray standard is placed in a cartridge of the DVD-RAN standard and the apparatus is operated, if it is determined that the disk has a short operation distance from a result of determination of the disk discriminating means and the disk cartridge detecting means detects that the disk is in a disk cartridge and the cartridge distinguishing means distinguishes that the disk cartridge is a normal cartridge with which the pickup lens or the lens protector possibly comes into contact at the time of focusing on the disk having the short operation distance, the formatting operation is carried out such that a region including a range in the vicinity of the outer periphery of the disk where the pickup lens or the lens protector possibly collides against the disk cartridge of the DVD-RAM standard, and the moving range of the pickup is restricted such that the pickup does not move to the substitute region which is allocated to the outer periphery of the disk of the Blu-Ray standard. Therefore, it is possible to prevent the pickup lens, the lens base and the lens protector from coming into contact with the structure of the disk cartridge and to prevent the pickup from being damaged.

According to the fifteenth aspect of the invention, the pickup protecting method of the optical disk record and playback apparatus comprises a step of loading the optical disk medium onto a disk loading portion, a step of rotating the loaded optical disk medium, a step of discriminating kinds of the optical disk media, a step of detecting whether or not the optical disk medium loaded into the apparatus is placed in the disk cartridge, and a step of restricting a moving range of a pickup which optically reads information which is recorded in the optical disk medium when it is discriminated that the optical disk medium has a short operation distance and it is detected that the optical disk medium is placed in the disk cartridge. According to this aspect, when the disk discriminating means discriminates that the disk has the short operation distance and it is detected that the disk is in the disk cartridge, the moving range of the pickup is limited. Therefore, it is possible to prevent the pickup lens, the lens base and the lens protector from coming into contact with the structure of the disk cartridge and, to prevent the pickup from being damaged.

According to the sixteenth aspect of the invention, the pickup protecting method of the optical disk record and playback apparatus comprises a step of loading the optical disk medium onto a disk loading portion, a step of rotating the loaded optical disk medium, a step of discriminating kinds of the optical disk media, a step of detecting whether or not the optical disk medium loaded into the apparatus is placed in the disk cartridge, and a step of stopping an actuating operation When it is discriminated that the optical disk medium has a short operation distance and it is detected that the optical disk medium is placed in the disk cartridge. According to this aspect, when the disk discriminating means discriminates that the disk has the short operation distance and it is detected that the disk is in the disk cartridge, it is determined that the disk does not correspond to the disk cartridge, and the actuating operation is stopped. Therefore, it is possible to prevent the pickup lens, the lens base and the lens protector from coming into contact With the structure of the disk cartridge and to prevent the, pickup from being damaged.

According to the seventeenth, aspect of the invention, in the pickup protecting method of the optical disk record and playback apparatus of the fifteenth or sixteenth aspect, the disk cartridge is of a DVD-RAM standard, and the optical disk medium having the short operation, distance is a disk of a Blu-Ray standard. According to this aspect, even when a disk of the Blu-Ray standard is placed into a cartridge of the DVD-RAM standard, it is possible to prevent the pickup lens, the lens base and the lens protector from coming into contact with the structure of the disk cartridge and to prevent the pickup from being damaged.

According to the eighteenth aspect of the invention, in the pickup protecting method of the optical disk record and playback apparatus of the fifteenth aspect, the disk cartridge is of a DVD-RAM standard, and the optical disk medium having the short operation distance is a disk of a Blu-Ray standard, and the method further comprises a step of restricting the pickup not to move to a substitute region which is allocated to an outer periphery of the optical disk medium. According to this aspect, even when a disk of a Blu-Ray standard is placed in a cartridge of a DVD-RAM standard and the apparatus is operated, the disk discriminating means discriminates that the disk is of the Blu-Ray standard having the short operation distance, and when it is detected that the disk is in a disk cartridge of the DVD-RAM standard, the moving range of the pickup is restricted so that the pickup does not move to the substitute region which is allocated to the outer periphery of the optical disk medium. Therefore, it is possible to prevent the pickup lens, the lens base and the lens protector from coining into contact with the structure of the disk cartridge and to prevent the pickup from being damaged.

According to the nineteenth aspect of the invention, in the pickup protecting method of the optical disk record and playback apparatus of the eighteenth aspect, the method further comprises a step of not seeking the substitute region and but returning a playback error when a playback command is included in address data of the substitute region. According to this aspect, even when a disk of a Blu-Ray standard is placed in a cartridge of a DVD-RAM standard and the apparatus is operated, the disk discriminating means discriminates that the disk is of the Blu-Ray standard having the short operation distance, and when it is detected that the disk is in a disk cartridge of the DVD-RAM standard, if a playback command exists in data of an address where a registered substitute region is in the vicinity of the outer periphery of the disk, the substitute region in the vicinity of the outer periphery is not sought and the playback error is immediately be returned. Therefore, it is possible to prevent the pickup lens, the lens base and the lens protector from coming into contact with the structure of the disk cartridge and to prevent the pickup from being damaged.

According to the twentieth aspect of the invention, in the pickup protecting method of the optical disk record and playback apparatus of the eighteenth aspect, the method further comprises a step of carrying out a formatting operation such that a range where movement of the pickup is restricted is included in the substitute region. According to this aspect, even when a disk of the Blu-Ray standard is placed in a cartridge of the DVD-RAM standard and the apparatus is operated, the disk discriminating means discriminates that the disk is of the Blu-Ray standard having the short operation distance, and the formatting operation when it is detected that the disk cartridge is of the DVD-RAM standard is carried out such that a region including a range in the vicinity of the outer periphery of the disk where the pickup lens or the lens protector possibly collides against the disk cartridge of the DVD-RAM standard becomes the substitute region, and the moving range of the pickup is restricted so that the pickup does not move to the substitute region which is allocated to the outer periphery of the optical disk medium. Therefore, it is possible to prevent the pickup lens, the lens base and the lens protector from coming into contact with the structure of the disk cartridge and to prevent the pickup from being damaged.

According to the twenty-first aspect of the invention, the pickup protecting method of the optical disk record and playback apparatus comprises a step of loading the optical disk medium onto a disk loading portion, a step of rotating the loaded optical disk medium, a step of discriminating kinds of the optical disk media, a step of detecting whether or not the optical disk medium loaded into the apparatus is placed in the disk cartridge, a step of distinguishing whether the disk cartridge is a normal cartridge with which the pickup lens or the lens protector possibly comes into contact at the time of focusing on the optical disk medium having a short operation distance, or the disk cartridge is an exclusive cartridge whose shape is changed so such that the pickup lens or the lens protector does not come into contact with the exclusive cartridge at the time of focusing on the optical disk medium having the short operation distance, and a step of restricting a moving range of a pickup which optically reads information which is recorded in the optical disk medium when it is discriminated that the optical disk medium has the short operation distance and it is detected that the optical disk medium is placed in the disk cartridge. According to this aspect, when it is determined that the disk has the short operation distance from a result of determination of the disk discriminating means and the disk cartridge detecting means detects that the disk is in a disk cartridge and the cartridge distinguishing means distinguishes that the disk cartridge is a normal cartridge with which the pickup lens or the lens protector possibly comes into contact at the time of focusing on the disk having the short operation distance, the moving range of the pickup moving means is restricted. Therefore, it is possible to prevent the pickup lens, the lens base and the lens protector from coming into contact with the structure of the disk cartridge and to prevent the pickup from being damage.

According to the twenty-second aspect of the invention, the pickup protecting method of the optical disk record and playback apparatus comprises a step of loading the optical disk medium onto a disk loading portion, a step of rotating the loaded optical disk media, a step of discriminating kinds of the optical disk media, a step of detecting whether or not the optical disk medium loaded into the apparatus is placed in the disk cartridge, a step of distinguishing whether the disk cartridge is a normal cartridge with which the pickup lens or the lens protector possibly comes into contact at the time of focusing on the optical disk medium having a short operation distance, or the disk cartridge is an exclusive cartridge whose shape is changed so such that the pickup lens or the lens protector does not come into contact with the exclusive cartridge at the time of focusing on the optical disk medium having the short operation distance, and a step of stopping an actuating operation when it is discriminated that the optical disk medium has the short operation distance and it is detected that the optical disk medium is placed in the disk cartridge and it is distinguished that the disk cartridge is a normal cartridge. According to this aspect, when it is determined that the disk has the short operation distance from a result of determination of the disk discriminating means and the disk cartridge detecting means, detects that the disk is in a disk cartridge and the cartridge distinguishing means distinguishes that the disk cartridge is a normal cartridge with which the pickup lens or the lens protector possibly comes into contact at the time of focusing on the disk having the short operation distance, it is determined that the disk does not correspond to the disk cartridge, and the actuating operation is stopped. Therefore, it is possible to prevent the pickup lens, the lens base and the lens protector from coming into contact with the structure of the disk cartridge and to prevent the pickup from being damaged.

According to the twenty-third aspect of the invention, in the pickup protecting method of the optical disk record and playback apparatus of the twenty-first or twenty-second aspect, the exclusive cartridge includes an exclusive cartridge detecting hole, and the method further comprises a step of distinguishing between the exclusive cartridge and the normal cartridge based on presence or absence of the exclusive cartridge detecting hole by the cartridge distinguishing means. According to this aspect, the cartridge distinguishing means distinguishes that a shape of a cartridge is changed when information is the exclusive disk distinguishing information and a disk is in a disk cartridge from presence or absence of cartridge-exclusive disk distinguishing information of shape change recorded in an optical disk medium placed in the disk cartridge, and when there is no exclusive disk distinguishing information and the disk is in the disk cartridge, the cartridge distinguishing means distinguishes that the disk cartridge is a normal cartridge. Therefore, it is possible to prevent the pickup lens, the lens base and the lens protector from coming into contact with the structure of the disk cartridge and to prevent the pickup from being damaged.

According to the twenty-fourth aspect of the invention, in the pickup protecting method of the optical disk record and playback apparatus of the twenty-first or twenty-second aspect, the method further comprises a step of reading distinguishing information which is recorded in a BCA (Burst Cut Area) of the optical disk medium and distinguishing information which is recorded in a PCA (Power Calibration Area) of the optical disk medium, and distinguishing between the exclusive cartridge and the normal cartridge by the cartridge distinguishing means. According to this aspect, the exclusive disk distinguishing information includes the distinguishing character string included in the BCA information formed in the optical disk medium. Therefore, it is possible to prevent the pickup lens, the lens base and the lens protector from coming into contact with the structure of the disk cartridge and to prevent the pickup from being damaged.

According to the twenty-fifth aspect of the invention, in the pickup protecting method of the optical disk record and playback apparatus of the twenty-fourth aspect, the distinguishing information includes information in which a distinguishing character string indicative of model information of a recording apparatus which records in the optical disk medium is changed to a character string which is different from a normal character string. According to this aspect, the exclusive disk distinguishing information includes information in which the distinguishing character string indicative Of model information of the recording apparatus which records in the disk is changed to a character string which is different from a normal character string. Therefore, it is possible to prevent the pickup lens, the lens base and the lens protector from coming into contact with the structure of the disk cartridge and to prevent the pickup from being damaged.

According to the twenty-sixth aspect of the invention, in the pickup protecting Method of the optical disk record and playback apparatus of the twenty-first or twenty-second aspect, the disk cartridge is of a DVD-RAM standard, and the optical disk medium having the short operation distance is a disk of a Blu-Ray standard. According to this aspect, even if a disk of the Blu-Ray standard is placed in a cartridge of the DVD-RAM standard and the apparatus is operated, it is possible to prevent the pickup lens, the lens base and the lens protector from coming into contact with the structure of the disk cartridge and to prevent the pickup from being damaged.

According to the twenty-seventh aspect of the invention, in the pickup protecting method of the optical disk record and playback apparatus of the twenty-first aspect, the disk cartridge is of a DVD-RAM standard, and the optical disk medium having the short operation distance is a disk of a Blu-Ray standard, and in the step of restricting the moving range of the pickup, the pickup is restricted not to move to a substitute region which is allocated to an outer periphery of the optical disk medium. According to this aspect, even when a disk of the Blu-Ray standard is placed in a cartridge of the DVD-RAM standard and the apparatus is operated, if it is determined that the disk has a short operation distance and the disk cartridge detecting means detects that the disk is in a disk cartridge and it is determined that the disk cartridge is a normal cartridge with which a pickup lens or a lens protector possibly comes into contact at the time of focusing on the disk having the short operation distance from a result of determination of the disk discriminating means, the moving range of the pickup moving means is restricted so that the pickup does not move to the substitute region which is allocated to the outer periphery of the disk of the Blu-Ray standard. Therefore, it is possible to prevent the pickup lens, the lens base and, the lens protector from coming into contact with the structure of the disk cartridge and to prevent the pickup from being damaged.

According to the twenty-eighth aspect of the invention, in the pickup protecting method of the optical disk record and playback apparatus of the twenty-seventh, aspect, a formatting operation is carried out such that a range where movement of the pickup is restricted is included in the substitute region. According to this aspect, even when a disk of the Blu-Ray standard is placed in a cartridge of the DVD-RAM standard and the apparatus is operated, if it is determined that the disk has a short operation distance from a result of determination of the disk discriminating means and the disk cartridge detecting means detects that the disk is in a disk cartridge and the cartridge distinguishing means distinguishes that the disk cartridge is a normal cartridge with which the pickup lens or the lens protector possibly comes into contact at the time of focusing on the disk having the short operation distance, the formatting operation is carried out such that a region including a range in the vicinity of the outer periphery of the disk where the pickup lens or the lens protector possibly collides against the disk cartridge of the DVD-RAM standard, and the moving range of the pickup is restricted such that the pickup does not move to the substitute region which is allocated to the outer periphery of the disk of the Blu-Ray standard. Therefore, it is possible to prevent the pickup lens, the lens base and the lens protector from coming into contact with the structure of the disk cartridge and to prevent the pickup from being damaged.

[First Embodiment]

Embodiments of an optical disk record and playback apparatus and a pickup protecting method thereof according to the present invention will be described in detail with reference to the drawings.

The optical disk record and playback apparatus of the embodiment of the invention will be described using FIGS. 1 to 7.

Figure 2:
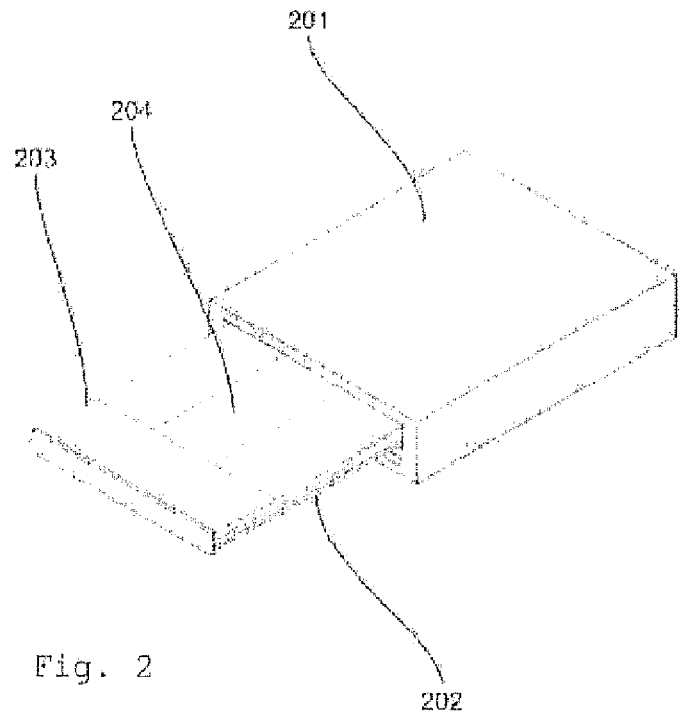
FIG. 2 is a perspective view when an optical disk medium placed in a disk cartridge is loaded into the apparatus.
Figure 3:
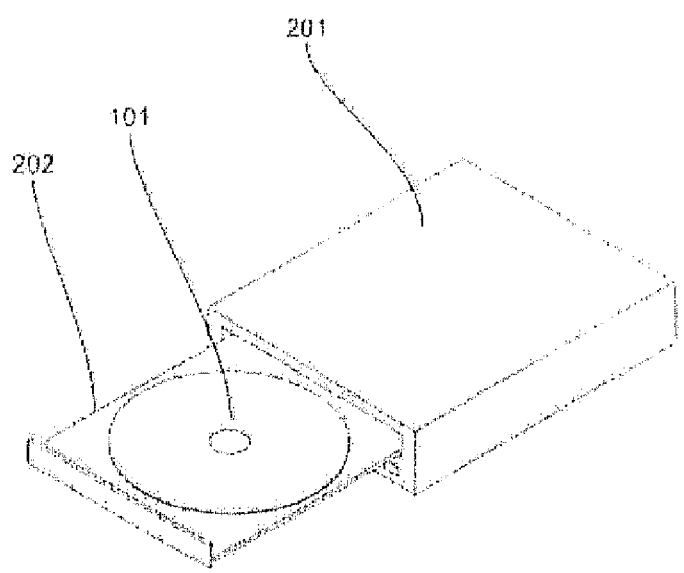
FIG. 3 is a perspective view when an optical disk medium having no disk cartridge is loaded into the apparatus.
Figure 4:
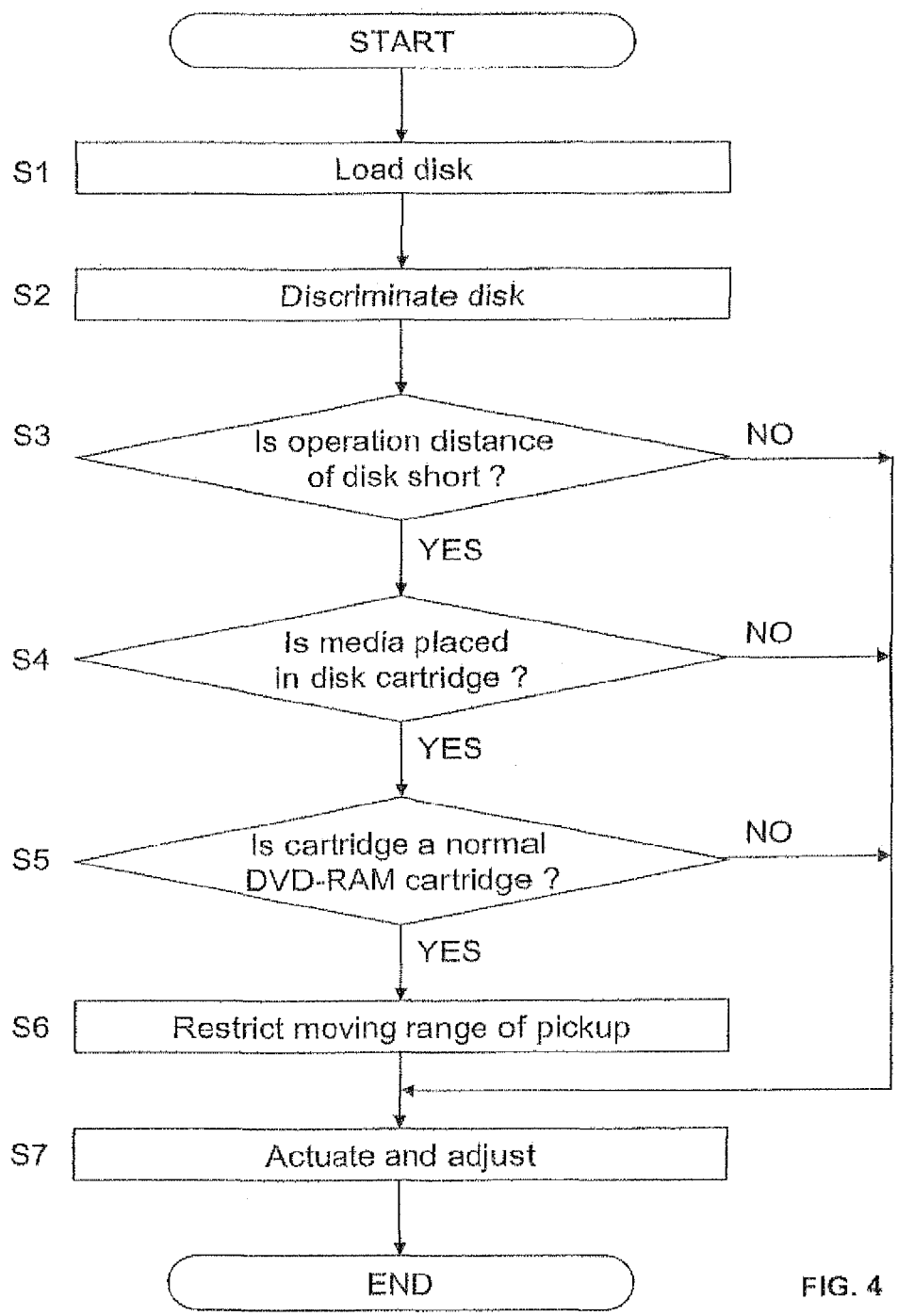
FIG. 4 is a flowchart of operations from a loading operation of the optical disk medium into the apparatus to completion of an actuating operation.
Figure 5:
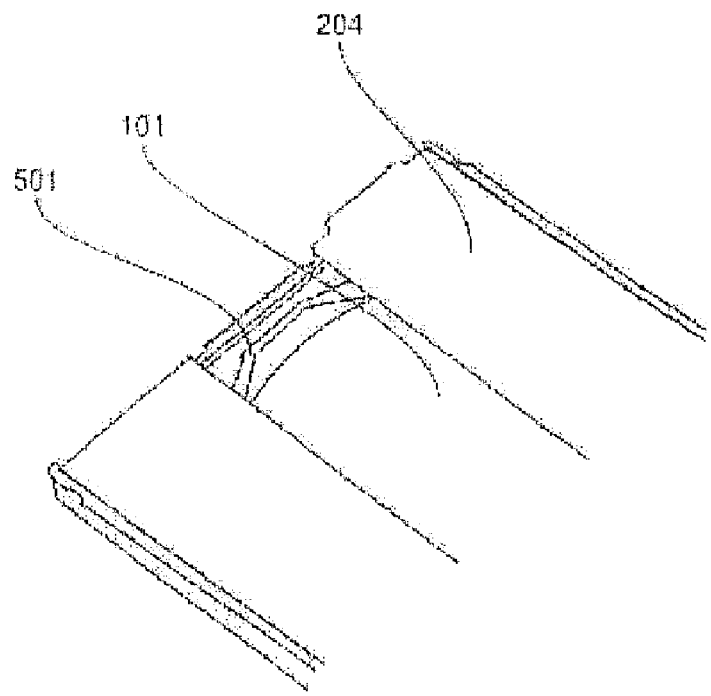
FIG. 5 is a perspective view of an essential portion showing a bridge structure of a disk cartridge of the apparatus.
Figure 6:
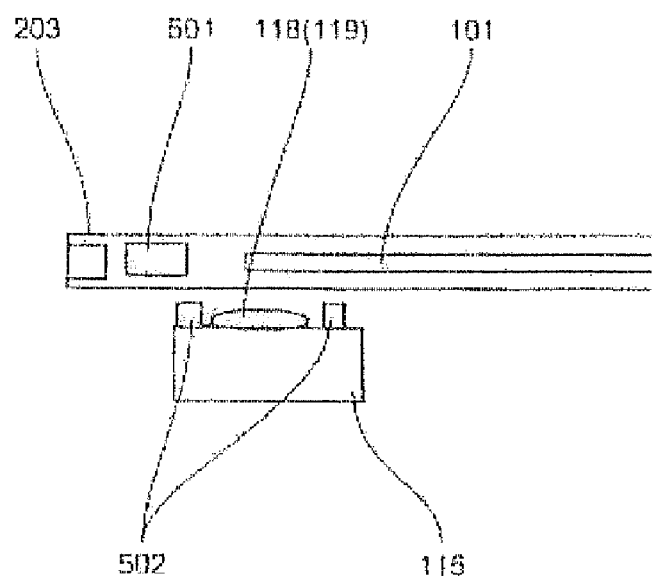
FIG. 6 is a diagram showing a positional relation between a bridge structure of a DVD-RAM cartridge of the apparatus and a pickup lens and a lens protector.
Figure 7:
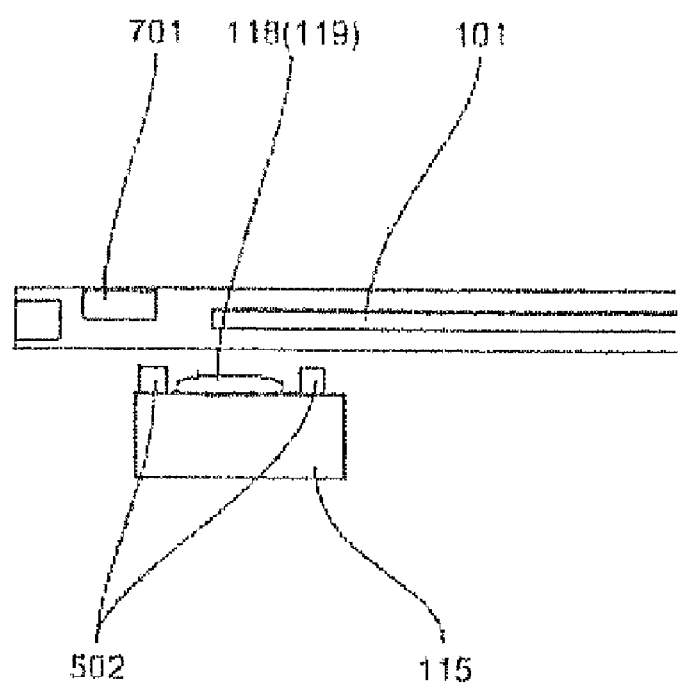
FIG. 7 is a diagram showing a positional relation between a bridge structure of a Blu-Ray disk-exclusive cartridge of the apparatus and a pickup lens and a lens protector.

FIG. 1 is a block diagram showing an optical disk record and playback apparatus according to an embodiment of the present invention expressed by means of function realizing means. FIG. 2 is a perspective view showing a case where an optical disk medium placed in a disk cartridge is loaded into the apparatus. FIG. 3 is a perspective view showing a case where an optical disk medium having no disk cartridge is loaded into the apparatus. FIG. 4 is a flowchart of operations from a loading operation of the optical disk medium into the apparatus to completion of an actuating operation. FIG. 5 is a perspective view of an essential portion showing a bridge structure of a disk cartridge used in the embodiment. FIG. 6 is a diagram showing a positional relation between a bridge structure of a first cartridge (DVD-RAM cartridge) and a pickup lens and a lens protector. FIG. 7 is a diagram showing a positional relation between a bridge structure of a second cartridge (Blu-Ray disk-exclusive cartridge) and a pickup lens and a lens protector.

This embodiment is applied to a Blu-Ray disk ("BD", hereinafter) apparatus. The BD apparatus can record and playback a disk of CD, DVD and BD standards. An optical disk medium 101 is an optical disk for example, and there are generally optical disks of CD, DVD, BD, HD and DVD standards. Disk loading means 102 is a circular clamper which is fitted to a turntable 104 for example. A magnetic substance is assembled into the turntable 104 or the disk loading means 102, and the optical disk medium 101 is sandwiched between the turntable 104 and the disk loading means 102 by this magnetic force. An optical disk record and playback apparatus 201 according to the embodiment includes a disk loading mechanism, and it is possible to realize a method of placing and loading the optical disk medium 101 directly on a tray 202 as shown in FIG. 3, and a method of placing and loading an optical disk medium 101 placed in a disk cartridge 203 on the tray 202 together with the disk cartridge 203 as shown in FIG. 2. According to the method of loading the optical disk medium 101 together with the disk cartridge 203, a shutter 204 of the disk cartridge 203 is opened and closed by a loading mechanism and the optical disk medium 101 is loaded onto the turntable 104 by the disk loading means 102.

Disk rotating means 103 is a spindle motor for example. The spindle motor 103 rotates the turntable 104 by control of a spindle control circuit 106. A pickup 107 includes two optical systems, i.e., a CD/DVD optical system and a BD optical system. The CD/DVD optical system includes a CD/DVD laser control circuit 108, a CD/DVD dual wavelength laser diode 109, a CD/DVD coupling lens 110, a CD/DVD half mirror 116, a CD/DVD objective lens 118 and a CD/DVD light receiving element 120. The BD optical system similarly includes a BD laser control circuit 113, a BD laser diode 112, a BD coupling lens 111, a BD spherical aberration correcting lens 114, a BD half mirror 117, a BD objective lens 119 and a BD light receiving element 121. The BD spherical aberration correcting lens 114 is driven by a small stepping motor (not shown) and a spherical aberration correcting circuit 124, and the BD spherical aberration correcting lens 114 corrects a spherical aberration caused by an interlayer distance (75 μm, 100 μm) of a double-layered disk of a BD. The CD/DVD objective lens 118 and the BD objective lens 119 are placed on a same lens rack 115, and they are driven in a focus direction and tracking direction by an actuator. Although optical paths of the CD/DVD optical system and the BD optical system of the embodiment are illustrated as independent paths, the CD/DVD optical system and the BD optical system can share some of the optical paths for downsizing. The CD/DVD optical system and the BD optical system can share the objective lens and may constitute one objective lens.

A focus driving circuit 122 drives the lens rack 115 in a focus direction by a focus actuator coil (not shown). A tracking driving circuit 123 drives the lens rack 115 in a tracking direction by the tracking actuator coil (not shown). A tilt driving circuit 128 drives the lens rack 115 in a radial inclination direction by e tilt actuator coil (not shown).

The CD/DVD laser control circuit 108 controls the CD/DVD dual wavelength laser diode 109 and emits CD/DVD playback laser at an appropriate level. The BD laser control circuit 113 likewise controls the BD laser diode 112 to emit BD playback laser at an appropriate level.

The emitted CD/DVD laser passes through the CD/DVD coupling lens 110 and is collected by the CD/DVD objective lens 118 through the CD/DVD half mirror 116. The emitted light-emitting BD laser passes through the BD coupling lens 111 and is collected by the BD objective lens 119 through the BD half mirror 117.

Reflection light of the CD/DVD playback laser from the optical disk medium 101 passes through the CD/DVD half mirror 116 and is received and detected by the CD/DVD light receiving element 120. Reflection light of the BD playback laser from the optical disk medium 101 passes through the BD half mirror 117 and is received and detected by the BD light receiving element 121.

Signals detected by the CD/DVD light receiving element 120 and the BD light receiving element 121 are sent to a signal processing circuit 125. The signal processing circuit 125 selects one of signal processing methods corresponding to a disk such as a CD, a DVD and a BD, produces signals such as FE (focus error), TE (tracking error), AS (all sum·full adding) and RF (playback signal) based on the selected signal processing method, and sends the signal to a control circuit 126.

A traverse driving circuit 129 drives a pickup moving. means 107a, and drives the pickup 107 in a radial direction. The pickup moving means 107a includes a stepping motor or a DC motor, a lead screw, and a rack mounted on the pickup 107.

The control circuit 126 controls the focus driving circuit 122, the tracking driving circuit 123 and the tilt driving circuit 128 based on a signal received by a digital signal processor.

The control circuit 126 plays back data, switches between the CD/DVD laser control circuit 108 and the BD laser control circuit 113 by an RF signal from the signal processing circuit 125, controls the spindle control circuit 106, controls rotation of a disk rotating means (spindle motor) 103, controls the traverse driving circuit 129, and moves the pickup 107 in the radial direction. A CPU 127a controls the signal processing circuit 125, selects one of the signal processing methods that is optimal for a kind of a disk which is supposed to be loaded currently, sets parameters of various controls in the control circuit 126, and outputs operation instructions to the control circuit 126.

Disk cartridge detecting means 130 detects whether the disk cartridge 203 pushes a physical switch using the physical switch, detects presence or absence of the disk cartridge 203, and sends data to the CPU 127a.

Cartridge distinguishing means 131 detects whether an exclusive cartridge detecting hole formed in the disk cartridge 203 pushes the physical switch using the physical switch for example, distinguishes whether the disk cartridge is an exclusive cartridge or a normal cartridge, and sends data to the CPU 127a.

Here, the exclusive cartridge is a cartridge whose shape is changed so that the pickup, lens or the lens protector does not come into contact with the cartridge even at the time of focusing on the optical disk medium having a short operation distance. The exclusive cartridge is provided with the exclusive cartridge detecting hole. The normal cartridge is a cartridge with which the pickup lens or the lens protector may possibly come into contact at the time of focusing on the optical disk medium having a short operation distance, and the normal cartridge is not provided with the exclusive cartridge detecting hole. If there is the exclusive cartridge detecting hole, the physical switch is not pushed, and if there is no exclusive cartridge detecting hole, the physical switch is pushed.

The CPU 127a includes disk discriminating means 132 which discriminates kinds of the optical disk media 101, and restricting means 133 which restricts a moving range of the pickup 107. The restricting means 133 sends a signal to the traverse driving circuit 129 through the control circuit 126 depending upon results of the disk cartridge detecting means 130, the cartridge distinguishing means 131 and the disk discriminating means 132, and the moving range of the pickup 107 is restricted. The disk discriminating means 132 discriminates kinds of the optical disk media 101 based on the operation distance, or other elements such as a reflection light amount in addition to the operation distance.

Although detailed explanation of the discrimination of a disk will be omitted because it does not directly relate to the present invention, not only positional information by which reflection light is detected using a difference of the operation, distance of each of standards of the disks, but also a light amount of the reflection light and various kinds of servo signals are used of course.

Next, the operation of the optical disk record and playback apparatus of the embodiment will be described.

A series of operations is executed by software which is previously programmed in the CPU 127a.

In step 1, a disk loading operation is carried out. The disk loading operation is carried, out by the disk loading means 102 of the optical disk record and playback apparatus 201. The optical disk record and playback apparatus 201 includes a disk loading mechanism, and it is possible to realize a method of loading an optical disk medium 101 by placing the same directly on the tray 202 as shown in FIG. 3, and a method of placing and loading an optical disk medium 101 placed in the disk cartridge 203 onto the tray 202 together with the disk cartridge 203 as shown in FIG. 2. Therefore, it is possible to handle both an optical disk medium 101 having no cartridge and an optical disk medium 101 placed in a cartridge.

Next, a disk discriminating operation is carried out by the disk discriminating means 132 (step 2). As one method of discriminating a disk, a difference in thickness of a cover layer between a BD, a DVD and a CD is used The CD/DVD laser control circuit 108 and the BD laser control circuit 113 are switched over by a signal from the control circuit 126, laser is emitted, the focus driving circuit 122 is driven and a focus search is carried out. A signal detected by the CD/DVD light receiving element 120 or the BD light receiving element 121 is processed by the signal processing circuit 125, and the disk discriminating means 132 discriminates kinds of optical disk media 101 using the signal from the signal processing circuit 125.

This will be described more specifically below.

First, BD laser is emitted by the BD laser control circuit 113, the lens rack 115 is driven, by the focus driving circuit 122, thereby carrying out the focus search. If, the focus search is carried out, reflection light of the disk surface and reflection light of a recording layer are detected. In the case of a single-layered DB recording layer, the recording layer is located at a position of 0.1 mm depth from its disk surface. In the case of a double-layered DB recording layer, the recording layer is located at a position of 0.075 mm depth and at a position of 0.1 mm depth from its disk surface. In the case of a CD/DVD recording layer, the recording layer is located at a position of 1.2 mm depth from its disk surface. In the case of a DVD recording layer, the recording layer is located at a position of 0.6 mm depth from its disk surface.

An operation distance of the BD optical system is set to about. 0.3 mm. Therefore, if the focus search is carried out using the BD laser, even if search is carried out until the lens collides against the disk, since only reflection light of the disk surface is detected when the optical disk medium 101 is a CD or a DVD, it is possible to discriminate between the BD, the CD and the DVD.

If the focus search is carried out using BD laser and it is found that a disk is a BD, the number of layers and kinds of disks (BD-R, BD-RE and BD-ROM) are determined. When the focus search is carried out using the BD laser and a disk is determined as a CD or a DVD, focus search is carried out using CD/DVD laser, it is determined whether the disk is a CD or a DVD, a kind of the disk of DVD standards, the number of layers (DVD-R, DVD-RW, DVD+R, DVD+RW, DVD-RAM and the like), kinds of CD standards (CD-ROM, CD-R, CD-RW) are determined, and a laser circuit, a signal processing system and an internal gain which are optimal for respective disk kinds are selected.

The disk discriminating means 132 determines whether an optical disk medium 101 has a short operation distance (step 3). The operation distance differs depending upon kinds of disks and design of the optical system, but in the case of a BD whose cover layer is generally as thin as 0.1 mm and whose NA value is large, its operation distance is designed as short as about 0.3 mm, and an operation distance of a CD and a DVD is designed relatively long as long as 0.5 to 0.6 mm. This embodiment is described on the assumption that the optical disk medium 101 is a BD having a short operation distance.

When a disk is determined as a BD having the short operation distance in step 3, the disk cartridge detecting means 130 detects whether the optical disk medium 101 is placed in the disk cartridge 203 or the optical disk medium 101 has no disk cartridge 203 (step 4). As shown in FIG. 2, the disk cartridge 203 has an outer shape larger than a range where a circular optical disk medium 101 is placed on the tray 202, it is possible to detect whether there is the disk cartridge 203 by providing the physical switch at a location outside the disk placing range on the tray 202. a state of the physical switch is detected by the CPU 127a. When the disk is placed in the disk cartridge 203, the cartridge distinguishing means 131 determines whether the disk cartridge 203 is a BD-exclusive cartridge having a short operation distance.

As shown in FIGS. 6 and 7, the lens rack 115 of the pickup 107 is generally provided with a lens protector 502 at a location higher than objective lenses 118 and 119. Each of the objective lenses 118 and 119 has a constant distance from a lens center to a periphery of the lens, and when data of an outermost periphery of a disk is read, the objective lenses 118 and 119 and the lens protector 502 protrude outside from the outermost periphery of the disk. Surfaces of the optical disk medium 101 and the turntable 104 are deviated, and to maintain a focused state, it is necessary to control the focus driving circuit 122 and to vertically move the lens rack 115.

The disk cartridge 203 is designed for a disk of a conventional DVD-RAM standard and the disk cartridge 203 is not designed for a disk having an operation distance as short as 0.3 mm. Therefore, the disk cartridge 203 is generally provided at its location corresponding to outside of a disk outer periphery with a bridge structure 501 for reinforcing its structure as shown in FIG. 5. Therefore, in the case of a BD placed in the disk cartridge of the DVD-RAM standard, when data, is to be recorded in the vicinity of an outermost location of the optical disk medium 101 or data existing in the vicinity of an outermost location of the optical disk medium 101 is to be played back, if the surface is largely deviated, the objective lenses 118 and 119 or the lens protector 502 collide against the bridge structure 501. A necessary strength of the bridge structure 501 can not be secured only by merely thinning the bridge structure 501.

From the above reason, a bridge structure 701 is shifted in a direction separating away from the lens rack 115 as shown in FIG. 7. The tray 202 of this BD-exclusive cartridge is provided with the exclusive cartridge detecting hole for distinguishing from a disk cartridge (normal cartridge) of DVD-RAM standard. By providing a switch at a location corresponding to the exclusive cartridge detecting hole, it is possible to distinguish between the exclusive cartridge and the normal cartridge.

In this embodiment, if a switch corresponding to the exclusive cartridge detecting hole is not pressed in a state where a cartridge-presence/absence switch is pressed by the cartridge distinguishing means 131, it is determined that the disk cartridge is an exclusive cartridge. If the switch corresponding to the exclusive cartridge detecting hole is pressed in a state where a cartridge-presence/absence switch is pressed, it is determined that the disk cartridge is a normal DVD-RAM cartridge.

If it is determined that the BD is in a normal DVD-RAM cartridge, a moving range of the pickup 107 is restricted by the restricting means 133 (step 6).

A position where the objective lenses 118 and 119 and the lens protector 502 collide against the bridge structure 501 is estimated by design or size. Therefore, the moving range of the pickup 107 is previously set for each of kinds of the optical disk media 101. The moving distance of the pickup 107 is measured by the number of steps of the stepping motor. According to a standardized BD, regions which are used as substitutes called substitute regions when an error is generated at the time of recording are determined on an innermost periphery, an outermost periphery and in the vicinity thereof on its format. Normally, these regions are not generally used unless a recording error is generated. Therefore, the restricting means 133 restricts the moving range so that the pickup 107 is not moved to all of or a portion of the innermost and outermost peripheries of the substitute region.

Then, remaining actuating operation and automatic adjustment are carried out in step 7, and the actuating operation is completed.

It is preferable that the actuating operation and the adjusting operation in step 7 are carried out after the restricting operation in step 6. This is because that some of the actuating operation and the adjusting operation require that the pickup 107 is moved to a location in the vicinity of the outermost periphery depending upon kinds of a disk, and if the pickup 107 is moved to the outermost periphery in the focusing ON state, there is fear that the objective lenses 118 and 119 and the lens protector 502 collide against the bridge structure 501 and the actuator coil or the lens is damaged.

When the actuating operation or the adjusting operation is carried out, if the movement of the pickup 107 is restricted by the restricting means 133, the pickup 107 is riot moved to the restricted range. Therefore, if the moving operation to the restricted range is included in the actuating operation or the adjusting operation, a movement changing operation for moving the pickup 107 to a location in the vicinity of the outermost periphery which is not within the restricted range is carried out by the restricting means 133.

When a SEEK command or a reading command to a region where the movement is restricted is issued after actuation, the actual SEEK operation is not carried out by the restricting means 133 an operation for returning a SEEK error and a READ error is carried out.

In the case of a recordable optical disk medium 101 of a standardized BD, a formatting operation for previously securing a substitute region is required before the optical disk medium 101 is used. When the movement of the pickup 107 is restricted by the restricting means 133, the formatting operation is carried out so that the substitute region includes the restricted range by instructions from the restricting means 133 to the control circuit 126. By this formatting operation, it is possible to set such that user's data is not recorded in the restricted region. When capacity of the substitute region is insufficient due to the restricted region, it is preferable the restricting means 133 instructs the control circuit 126 to secure a larger substitute region. If an address of the substitute region which is located in the restricted region is previously stored as a non-usable region at the time of the formatting operation, the pickup 107 does not move to the restricted region.

Although the embodiment has been described based on the case where the apparatus includes the cartridge distinguishing means 131 which distinguishes the BD-exclusive cartridge, but even if the apparatus does not have the cartridge distinguishing means 131, the invention can be carried out similarly. In this case, it is not possible to distinguish whether a cartridge is a BD-exclusive cartridge or a normal DVD-RAM cartridge. Therefore, if the disk discriminating means 132 determines that the BD is in a cartridge, the restricting operation for restricting a moving range of the pickup 107 should be carried out.

[Second Embodiment 2]

Next, another embodiment of the optical disk record and playback apparatus and the pickup protecting method thereof of the present invention will be described using FIGS. 2, 3 and 5 to 9.

Figure 8:
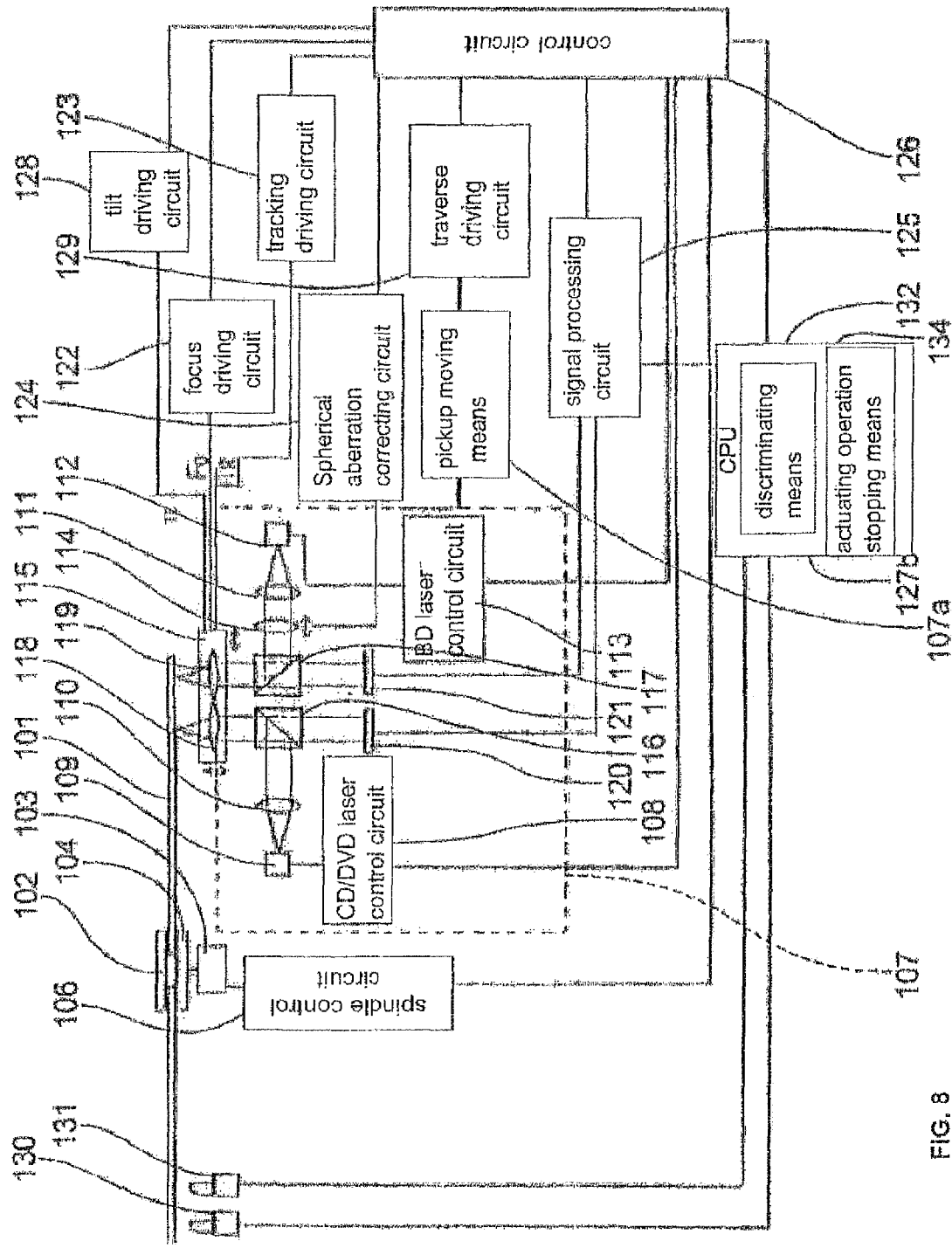
FIG. 8 is a block diagram when an optical disk record and playback apparatus according to another embodiment of the invention is applied to a Blu-Ray disk apparatus.
Figure 9:
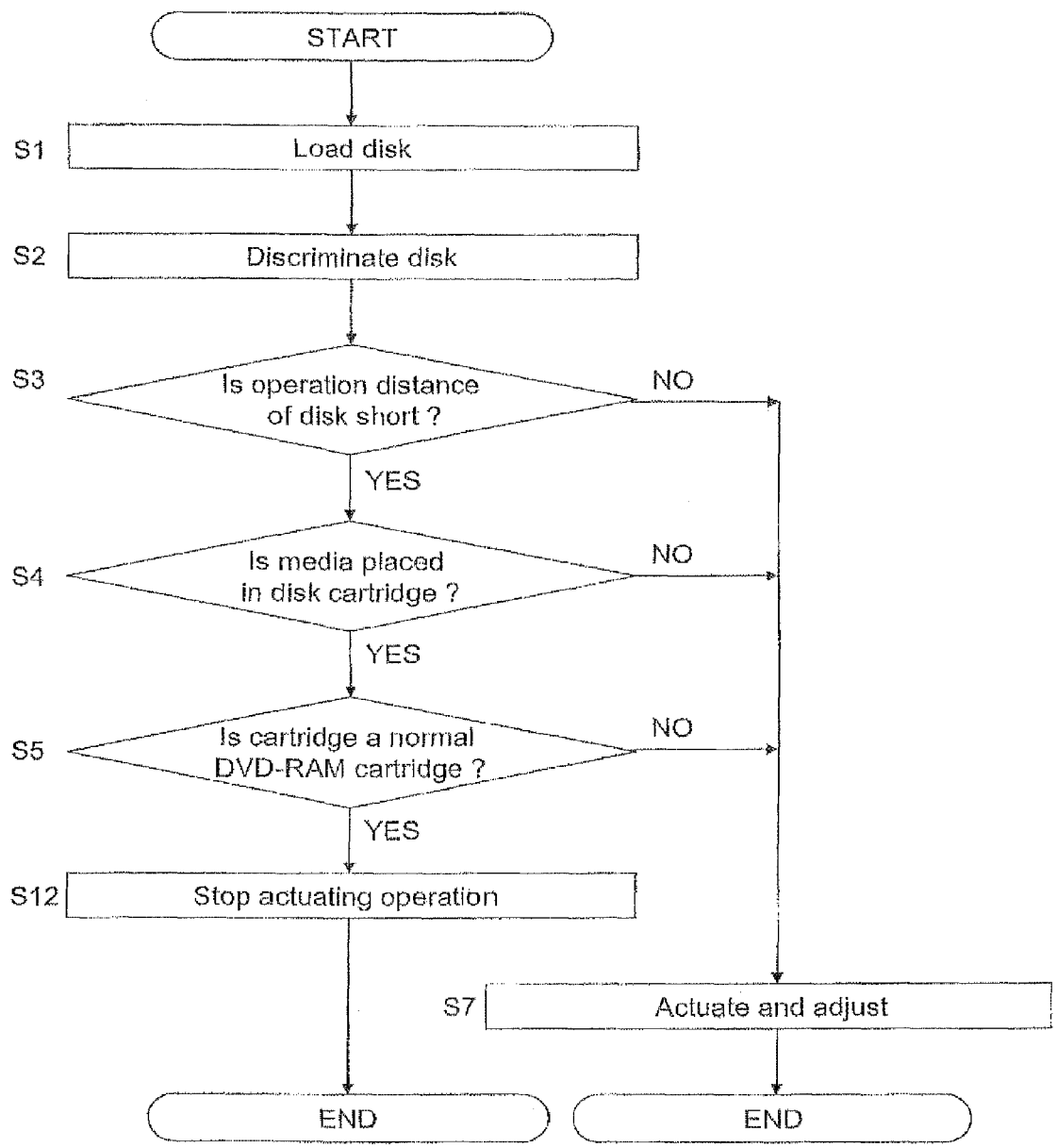
FIG. 9 is a flowchart showing operations from a loading operation of the optical disk medium into the apparatus to completion of an actuating operation.

FIG. 8 is a block diagram showing a case where the optical disk record and playback apparatus of this embodiment is applied to a Blu-Ray disk (BD, hereinafter) apparatus. In FIG. 8, concerning constituent elements of the second embodiment which are the same as those of the first embodiment, explanation thereof will be omitted. FIG. 9 is a flowchart showing operations from a loading operation of the optical disk medium into the apparatus, to completion of an actuating operation, and the series of operations is executed by software which is previously programmed in a CPU 127b.

The CPU 127b includes disk discriminating means 132 which discriminates kinds of optical disk media 101, and actuating operation stopping means 134 which stops an actuating operation. The actuating operation stopping means 134 stops the actuating operation through the control circuit 126 based on results of the disk cartridge detecting means 130, the cartridge distinguishing means 131 and the disk discriminating means 132. The disk discriminating means 132 discriminates kinds of optical disk media 101 while taking, into consideration, an operation distance, or not only the operation distance but also other elements such as a reflection light amount.

Although detailed description of the discrimination of a disk will be omitted because it does not directly relate to the present invention, not only positional information by which reflection light is detected using a difference of the operation distance of each of standards of the disks, but also a light amount of the reflection light and various kinds of servo signals are used of course.

In step 1, a disk loading operation is carried out. The disk loading operation is carried out by the disk loading means 102 of the optical disk record and playback apparatus 201. The optical disk record and playback apparatus 201 includes a disk loading mechanism, and it is possible to realize a method of loading an optical disk medium 101 by placing the same directly on the tray 202 as shown in FIG. 3, and a method, of placing and loading an optical disk medium 101 placed in the disk cartridge 203 onto the tray 202 together with the disk cartridge 203, opening and closing a shutter 204 of the disk cartridge 203 by a loading mechanism of the BD apparatus, and loading the optical disk medium 101 onto the turntable 104 by the disk loading means 102 as shown in FIG. 2. Therefore, it is possible to handle both an optical disk medium 101 having no cartridge and an optical disk medium 101 placed in a cartridge.

Next, a disk discriminating operation is carried out by the disk discriminating means 132 (step 2). As one method of discriminating a disk, a difference in thickness of a cover layer between a BD, a DVD and a CD is used. The CD/DVD laser control circuit 108 and the BD laser control circuit 113 are switched over by a signal from the control circuit 126, a laser is emitted, the focus driving circuit 122 is driven and a focus search is carried out. A signal detected by the CD/DVD light receiving element 120 or the BD light receiving element 121 is processed by the signal processing circuit 125, and the disk discriminating means 132 discriminates kinds of optical disk media 101 using the signal from the signal processing circuit 125.

This will be described more specifically below.

First, BD laser is emitted by the BD laser control circuit. 113, the lens rack 115 is driven by the focus driving circuit 122, thereby carrying out the focus search. If the focus search is carried out, reflection light of the disk surface and reflection light of a recording layer are detected. In the case of a single-layered DB recording layer, the recording layer is located at a position of 0.1 mm depth from its disk surface. In the case of a double-layered DB recording layer, the recording layer is located at a position of 0.075 mm depth and at a position of 0.1 mm depth from its disk surface. In the case of a CD/DVD recording layer, the recording layer is located at a position of 1.2 mm depth from its disk surface. In the case of a DVD recording layer, the recording layer is located at a position of 0.6 mm depth from its disk surface.

An operation distance of the BD optical system is set to about 0.3 mm. Therefore, if the focus search is carried out using the BD laser, even if search is carried out until the lens collides against the disk, since only reflection light of the disk surface is detected when the optical disk medium 101 is a CD or a DVD, it is possible to discriminate between the BD and the CD/DVD.

If the focus search is out using BD laser and it is found that a disk is a BD, the number of layers and kinds of disks (BD-R, BD-RE and BD-ROM) are determined. When the focus search is carried out using the BD laser and a disk is determined as a CD or a DVD, focus search is carried out using CD/DVD laser, it is determined whether the disk is a CD or a DVD, a kind of the disk of DVD standards, the number of layers (DVD-R, DVD-RW, DVD+R, DVD+RW, DVD-RAM and the like), kinds of CD standards (CD-ROM, CD-R, CD-RW) are determined, and a laser circuit, a signal processing system and an internal gain which are optimal for respective disk kinds are selected.

The disk discriminating means 132 determines whether an optical disk medium 101 has a short operation distance (step 3) The operation distance differs depending upon kinds of disks and design of the optical system, but in the case of a BD whose cover layer is generally as thin as 0.1 mm and whose NA value is large, its operation distance is designed as short as about 0.3 mm, and an operation distance of a CD and a DVD is designed relatively long as long as 0 to 0.6 mm. This embodiment is described, on the assumption, that the optical disk medium 101 is a BD having a short operation distance.

When a disk is determined as a BD having the short operation distance in step 3, the disk cartridge detecting means 130 detects whether the optical disk medium 101 is placed in the disk cartridge 203 or the optical disk medium 101 has no disk cartridge 203 (step 4). As shown in FIG. 2, the disk cartridge 203 has an outer shape larger than a range where a circular optical disk medium 101 is placed on the tray 202, it is possible to detect whether there is the disk cartridge 203 by providing the physical switch at a location outside the disk placing range on the tray 202. A state of the physical switch is detected by the CPU 127b. When the disk is placed in the disk cartridge 203, the cartridge distinguishing means 131 determines whether the disk cartridge 203 is a BD-exclusive cartridge having a short, operation distance.

As shown in FIGS. 6 and 7, the lens rack 115 of the pickup 107 is generally provided with a lens protector 502 at a location higher than objective lenses 118 and 119. Each of the objective lenses 118 and 119 has a constant distance from a lens center to a periphery of the lens, and when data of an outermost periphery of a disk is read, the objective lenses 118 and 119 and the lens protector 502 protrude outside from the outermost periphery of the disk. Surfaces of the optical disk medium 101 and the turntable 104 are deviated, and to maintain a focused state, it is necessary to control the focus driving circuit 122 and to vertically move the lens rack 115.

The disk cartridge 203 is designed for a disk of a conventional DVD-RAM standard and the disk cartridge 203 is not designed for a disk having an operation distance as short as 0.3 mm. Therefore, the disk cartridge 203 is generally provided at its location corresponding to outside of a disk outer periphery with a bridge structure 501 for reinforcing its structure as shown in FIG. 5. Therefore, in the case of a BD placed in the disk cartridge of the DVD-RAM standard, when data is to be recorded in the vicinity of an outermost location of the optical disk medium 101 or data existing in the vicinity of an outermost location of the optical disk medium 101 is to be played back, if the surface is largely deviated, the objective lenses 118 and 119 or the lens protector 502 collide against the bridge structure 501. A necessary strength of the bridge structure 501 can not be secured only by merely thinning the bridge structure 501.

From the above reason, a bridge structure 701 is shifted in a direction separating away from the lens rack 115 as shown in FIG. 7. The tray 202 of this BD-exclusive cartridge is provided with the exclusive cartridge detecting hole for distinguishing from a disk cartridge (normal cartridge) of DVD-RAM standard. By providing a switch at a location corresponding to the exclusive cartridge detecting hole, it is possible to distinguish between the exclusive cartridge and the normal cartridge.

In this embodiment, if a switch corresponding to the exclusive cartridge detecting hole is not pressed in a state where a cartridge-presence/absence switch is pressed by the cartridge distinguishing means 131, it is determined that the disk cartridge is an exclusive cartridge. If the switch corresponding to the exclusive cartridge detecting hole is pressed in a state where a cartridge-presence/absence switch is pressed, it is determined that the disk cartridge is a normal DVD-RAM cartridge.

When it is determined that the BD is placed in a normal DVD-RAM cartridge, since a combination of a disk and a cartridge which do riot correspond to each other is used, the actuating operation stopping means 134 stops the actuating operation (step 12).

Although the embodiment has been described based on the case where the apparatus includes the cartridge distinguishing means 131 which distinguishes the BD-exclusive cartridge, but even if the apparatus does not have the cartridge distinguishing means 131, the invention can be carried out similarly. In this case, it is not possible to distinguish whether a cartridge is a BD-exclusive cartridge or a normal DVD-RAM cartridge. Therefore, if the disk discriminating means 132 determines that the BD is in a cartridge, since there is a possibility that the pickup 107 is damaged, the actuating operation is stopped.

[Third Embodiment]

Next, another embodiment of the optical disk record and playback apparatus and the pickup protecting method thereof of the present invention will be described using FIGS. 1 to 3, 5 to 7 and 10.

Figure 10:
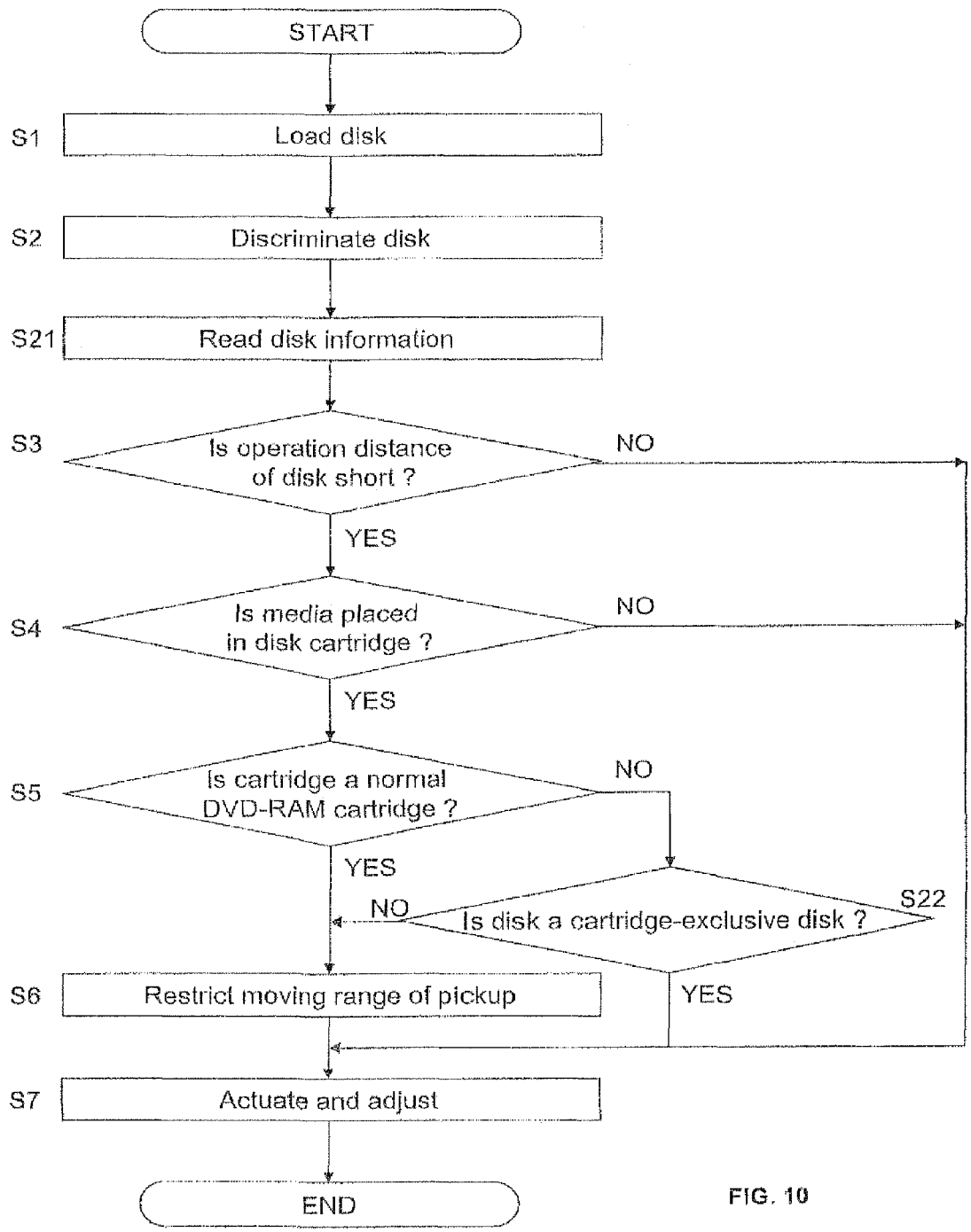
FIG. 10 is a flowchart showing operations from a loading operation of the optical disk medium into an optical disk record and playback apparatus according to another embodiment of the invention to completion of an actuating operation.

FIG. 10 is a flowchart showing operations from a loading operation of the optical disk medium into the apparatus to completion of an actuating operation, and the series of operations is executed by software which is previously programmed in a CPU 127a.

In step 1, a disk loading operation is carried out. The disk loading operation is carried out by the disk loading means 102 of the optical disk record and playback apparatus 201. The optical disk record and playback apparatus 201 includes a disk loading mechanism, and it is possible to realize a method of loading an optical disk medium 101 by placing the same directly on the tray 202 as shown in FIG. 3, and a method of placing and loading an optical disk medium 101 placed in the disk cartridge 203 onto the tray 202 together with the disk cartridge 203 as shown in FIG. 2. Therefore, it is possible to handle both an optical disk medium 101 having no cartridge and an optical disk medium 101 placed in a cartridge.

Next, a disk discriminating operation is carried out by the disk discriminating means 132 (step 2). As one method Of discriminating a disk, a difference in thickness of a cover layer between a BD, a DVD and a CD is used. The CD/DVD laser control circuit 108 and the BD Laser control circuit 113 are switched over by a signal from the control circuit 126, laser is emitted, the focus driving circuit 122 is driven and a focus search is carried out. A signal detected by the CD/DVD light receiving element 120 or the BD light receiving element 121 is processed by the signal processing circuit 125, and the disk discriminating means 132 discriminates kinds of optical disk media 101 using the signal from or the signal processing circuit 125.

This will be described more specifically below.

First, BD laser is emitted by the BD laser control circuit 113, the lens rack 115 is driven by the focus driving circuit 122, thereby carrying out the focus search. If the focus search is carried out, reflection light of the disk surface and reflection light of a recording layer are detected. In the case of a single-layered DB recording layer, the recording layer is located at a position of 0.1 mm depth from its disk surface. In the case of a double-layered DB recording layer, the recording layer is located at a position of 0.075 mm depth and at a position of 0.1 mm depth from its disk surface. In the case of a CD/DVD recording layer, the recording layer is located at a position of 1.2 mm depth from its disk surface. In the case of a DVD recording layer, the recording layer is located at a position of 0.6 mm depth from its disk surface.

An operation distance of the BD optical system is set to about 0.3 mm. Therefore, if the focus search is carried out using the BD laser, even if search is carried out until the lens collides against the disk, since only reflection light of the disk surface is detected when the optical disk medium 101 is a CD or a DVD, it is possible to discriminate between the BD and the CD/DVD.

If the focus search is carried out using BD laser and it is found that a disk is a BD, the number of layers and kinds of disks (BD-R, BD-RE and BD-ROM) are determined. When the focus search is carried out using the BD laser and a disk is determined as a CD or a DVD, focus search is carried out using CD/DVD laser, it is determined whether the disk is a CD or a DVD, a kind of the disk of DVD standards, the number of layers (DVD-R, DVD-RW, DVD+R, DVD+RW, DVD-RAM and the like), kinds of CD standards (CD-ROM, CD-R, CD-RW) are determined, and a laser circuit, e signal processing system and an internal gain which are optimal for respective disk kinds are selected.

Next, the servo is turned ON based on a circuit, selection which corresponds to a kind of an optical disk medium determined in step 2, and disk information is read (step 21).

Disk information which is read at that time may be a minimum information for determining whether a disk is a later-described cartridge-exclusive disk. The disk information includes information such as disk kinds and the number or layers which are generally physical information sets, and information, such as disk capacity and kinds of format which are logic information sets. Here, it is only necessary to read information indicating a fact that a disk medium is an optical disk medium 101 which is previously recorded in a disk and which is placed in a disk cartridge. For example, this is realized by recording distinguishing information (information recorded by removing a reflection film in a stripe shape by laser light) recorded in a BCA (Burst Cut Area) which is recorded inside of a data region and which can not be rewritten, and distinguishing information (special character string showing that a disk is an exclusive disk) which is recorded in a special region in the vicinity of an innermost periphery of a disk such as a PCA (Power Calibration Area), and reading the information. It is preferable that the distinguishing information includes information in which a distinguishing character string indicating model information of a recording apparatus which record information in an optical disk medium 101 is changed into a character string which is different from a normal character string.

The disk discriminating means 132 determines whether an optical disk medium 101 has a short operation distance (step 3). The operation distance differs depending upon kinds of disks and design of the optical system, but in the case of a BD whose cover layer is generally as thin as 0.1 mm and whose NA value is large, its operation distance is designed as short as about 0.3 mm, and an operation distance of a CD and a DVD is designed relatively long as long as 0.5 to 0.6 mm. This embodiment is described on the assumption that the optical disk medium 101 is a BD having a short operation distance.

When a disk is determined as a BD having the short operation distance in step 3, the disk cartridge detecting means 130 detects whether the optical disk medium 101 is placed in the disk cartridge 203 or the optical disk medium 101 has no disk cartridge 203 (step 4). As shown in FIG. 2, the disk cartridge 203 has an outer shape larger than a range where a circular optical disk medium 101 is placed on the tray 202, it is possible to detect whether there is the disk cartridge 203 by providing the physical switch at a location outside the disk placing range on the tray 202. A state of the physical switch is detected by the CPU 127a. When the disk is placed in the disk cartridge 203, the cartridge distinguishing means 131 determines whether the disk cartridge 203 is a BD-exclusive cartridge having a short operation distance.

As shown in FIGS. 6 and 7, the lens rack 115 of the pickup 107 is generally provided with a lens protector 502 at a location higher than objective lenses 118 and 119. Each of the objective lenses 118 and 119 has a constant distance from a lens center to a periphery of the lens, and when data of an outermost periphery of a disk is read, the objective lenses 118 and 119 and the lens protector 502 protrude outside from the outermost periphery of the disk. Surfaces of the optical disk medium 101 and the turntable 104 are deviated, and to maintain a focused state, it is necessary to control the focus driving circuit 122 and to vertically move the lens rack 115.

The disk cartridge 203 is designed for a disk of a conventional DVD-RAM standard and the disk cartridge 203 is not designed for a disk having an operation distance as short as 0.3 mm. Therefore, the disk cartridge 203 is generally provided at its location corresponding to outside of a disk outer periphery with a bridge structure 501 for reinforcing its structure as shown in FIG. 5. Therefore, in the case of a BD placed in the disk cartridge of the DVD-RAM standard, when data is to be recorded in the vicinity of an outermost location of the optical disk medium 101 or data existing in the vicinity of an outermost location of the optical disk medium 101 is to be played back, if the surface is largely deviated, the objective lenses 118 and 119 or the lens protector 502 collide against the bridge structure 501. A necessary strength of the bridge structure 501 can not be secured only by merely thinning the bridge structure 501.

From the above reason, a bridge structure 701 is shifted in a direction separating away from the lens rack 115 as shown in FIG. 7. The tray 202 of this BD-exclusive cartridge is provided with the exclusive cartridge detecting hole for distinguishing from a disk cartridge (normal cartridge) of DVD-RAM standard. By providing a switch at a location corresponding to the exclusive cartridge detecting hole, it is possible to distinguish between the exclusive cartridge and the normal cartridge.

In this embodiment, if a switch corresponding to the exclusive cartridge detecting hole is not pressed in a state where a cartridge-presence/absence switch is pressed by the cartridge distinguishing means 131, it is determined that the disk cartridge is an exclusive cartridge. If a switch corresponding to the exclusive cartridge detecting hole is pressed in a state where a cartridge-presence/absence switch is pressed, it is determined that the disk cartridge is a normal DVD-RAM cartridge. It is determined in step 22 whether the disk is a cartridge-exclusive disk using disk information which was read in step 21.

If it is distinguished that the BD is in a normal DVD-RAM cartridge, or even if a disk is in an exclusive cartridge, if it is determined that the disk is not an exclusive disk, a moving range of the pickup 107 is restricted by the restricting means 133 (step 6).

A position where the objective lenses 118 and 119 and the lens protector 502 collide against the bridge structure 501 is estimated by design or size. Therefore, the moving range of the pickup 107 is previously set for each of kinds of the optical disk media 101. The moving distance of the pickup 107 is measured by the number of steps of the stepping motor. According to a standardized BD, regions which are used as substitutes called substitute regions when an error is generated at the time of recording are determined on an innermost periphery, an outermost periphery and in the vicinity thereof on its format. Normally, these regions are not used unless a recording error is generated. Therefore, the restricting means 133 restricts the moving range so that the pickup 107 is not moved to all of or a portion of the innermost and outermost peripheries of the substitute region.

Then, remaining actuating operation and automatic adjustment are carried out in step 7, and the actuating operation is completed.

It is preferable that the actuating operation and the adjusting operation in step 7 are carried out after the restricting operation in step 6. This is because that some of the actuating operation and the adjusting operation require that the pickup 107 is moved to a location in the vicinity of the outermost periphery depending upon kinds of a disk, and if the pickup 107 is moved to the outermost periphery in the focusing ON state, there is fear that, the objective lenses 118 and 119 and the lens protector 502 collide against the bridge structure 501 and the actuator coil or the lens is damaged.

When the actuating operation or the adjusting operation is carried out, if the movement of the pickup 107 is restricted by the restricting means 133, the pickup 107 is not moved to the restricted range. Therefore, if the moving operation to the restricted range is included in the actuating operation or the adjusting operation, a movement changing operation for moving the pickup 107 to a location in the vicinity of the outermost periphery which is not within the restricted range is carried out by the restricting means 133.

When a SEEK command or a reading command to a region where the movement is restricted is issued after actuation, the actual SEEK operation is not carried out by the restricting means 133, an operation for returning a SEEK error a READ error is carried out.

In the case of a recordable optical disk medium 101 of a standardized BD, a formatting operation for previously securing a substitute region is required before the optical disk medium 101 is used. When the movement of the pickup 107 is restricted by the restricting means 133, the formatting operation is carried out so that the substitute region includes the restricted range by instructions from the restricting means 133 to the control circuit 126. By this formatting operation, it is possible to set such that user's data is not recorded in the restricted region. When capacity of the substitute region is insufficient due to the restricted region, it is preferable the restricting means 133 instructs the control circuit 126 to secure a larger substitute region. If an address of the substitute region which is located in the restricted region is previously stored as a non-usable region at the time of the formatting operation, the pickup 107 does not move to the restricted region.

Although the embodiment has been described based on the case where the apparatus includes the cartridge distinguishing means 131 which distinguishes the BD-exclusive cartridge, but even if the apparatus does not have the cartridge distinguishing means 131, the invention can be carried out similarly. In this case, it is not possible to distinguish whether a cartridge is a BD-exclusive cartridge or a normal DVD-RAM cartridge. Therefore, if the disk discriminating means 132 determines that the BD is in a cartridge, or even if a disk is in an exclusive cartridge, if it is determined that the disk is not an exclusive disk, the restricting operation for restricting a moving range of the pickup 107 should be carried out.

[Fourth Embodiment]

Next, another embodiment of the optical disk record and playback apparatus and the pickup protecting method thereof of the present invention will be described using FIGS. 2, 3, 5 to 8 and 11.

Figure 11:
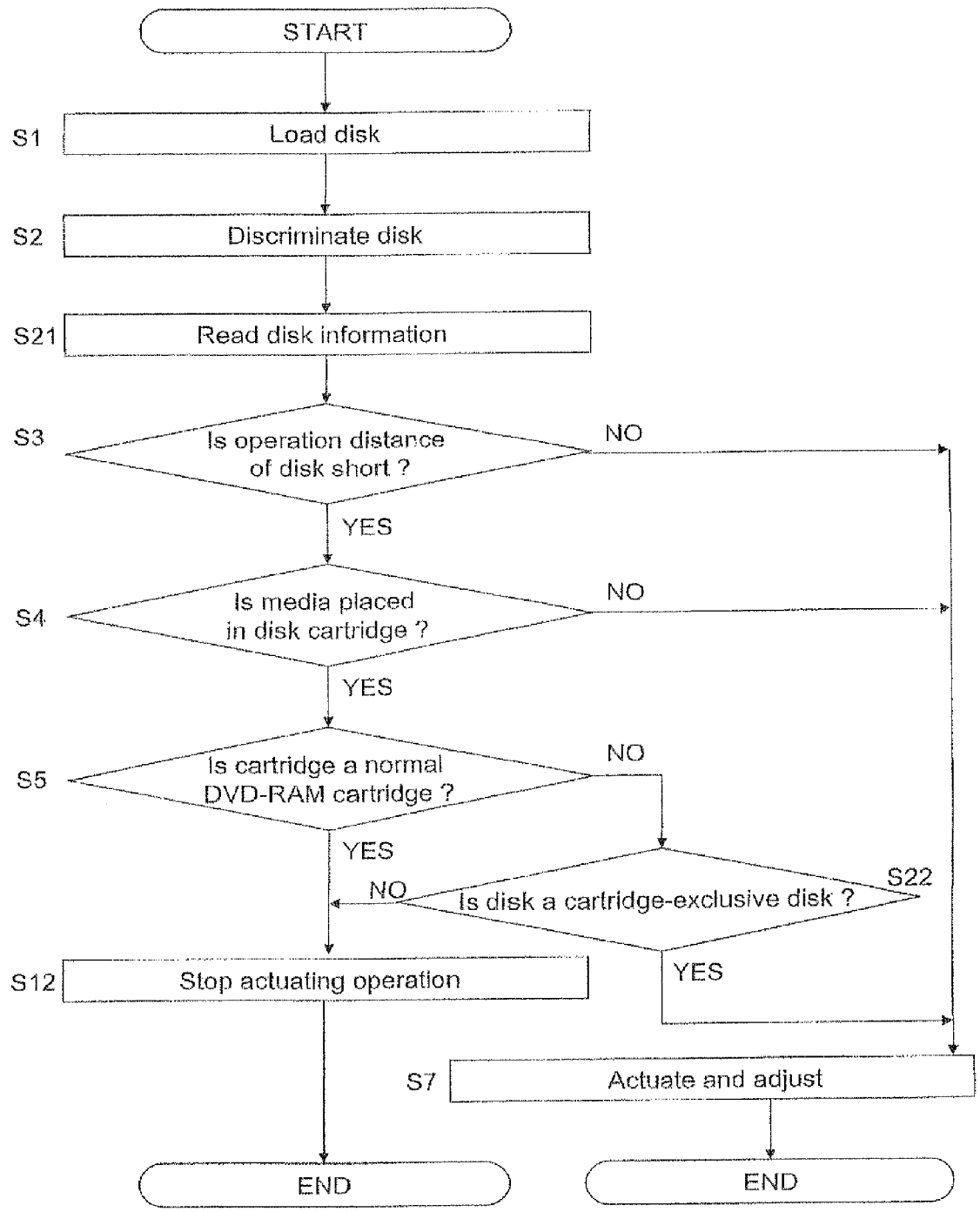
FIG. 11 is a flowchart showing operations from a loading operation of the optical disk medium into an optical disk record and playback apparatus according to another embodiment of the invention to completion of an actuating operation.

Concerning constituent elements which are the same as those of the second embodiment, explanation thereof will be omitted. FIG. 11 is a flowchart showing operations from a loading operation of the optical disk medium into the apparatus to completion of an actuating operation, and the series of operations is executed by software which is previously programmed in a CPU 127a.

The CPU 127b includes disk discriminating means 132 which discriminates kinds of optical disk media 101, and actuating operation stopping means 134 which stops an actuating operation. The actuating operation stopping means 134 stops the actuating operation through the control circuit 126 based on results of the disk cartridge detecting means 130, the cartridge distinguishing means 131 and the disk discriminating means 132. The disk discriminating means 132 discriminates kinds of optical disk media 101 while taking, into consideration, an operation distance, or not only an operation distance but also other elements such as a reflection light amount.

Although detailed description of the discrimination of a disk will be omitted because it does not directly relate to the present invention, not only positional information by which reflection light is detected using a difference of the operation distance of each of standards of the disks, but also a light amount of the reflection light and various kinds of servo signals are used of course.

In step 1, a disk loading operation is carried out. The disk loading operation, is carried out by the disk loading means 102 of the optical disk record and playback apparatus 201. The optical disk record and playback apparatus 201 includes a disk loading mechanism, and it is possible to realize a method of loading an optical disk medium 101 by placing the same directly on the tray 202 as shown in FIG. 3, and a method of placing and loading an optical disk medium 101 placed in the disk cartridge 203 onto the tray 202 together with the disk cartridge 203, opening and closing a shutter 204 of the disk cartridge 203 by a loading mechanism of the BD apparatus, and loading the optical disk medium 101 onto the turntable 104 by the disk loading means 102 as shown in FIG. 2. Therefore, it is possible to handle both an optical disk medium 101 having no cartridge and an optical disk medium 101 placed in a cartridge.

Next, a disk discriminating operation is carried out by the disk discriminating means 132 (step 2). As one method of discriminating a disk, a difference in thickness of a cover layer between a BD, a DVD and a CD is used. The CD/DVD laser control circuit 108 and the BD laser control circuit 113 are switched over by a signal from the control circuit 126, laser is emitted, the focus driving circuit 122 is driven and a focus search is carried out. A signal detected by the CD/DVD light receiving element 120 or the SD light receiving element 121 is processed by the signal processing circuit 125, and the disk discriminating means 132 discriminates kinds of optical disk media 101 using the signal from the signal processing circuit 125.

This will be described more specifically below.

First, BD laser is emitted by the BD laser control circuit 113, the lens rack 115 is driven by the focus driving circuit 122, thereby carrying out the focus search. If the focus search is carried out, reflection light of the disk surface and reflection light of a recording layer are detected. In the case of a single-layered DB recording layer, the recording layer is located at a position of 0.1 mm depth from its disk surface. In the case of a double-layered DB recording layer, the recording layer is located at a position of 0.075 mm depth and at a position of 0.1 mm depth from its disk surface. In the case of a CD/DVD recording layer, the recording layer is located at a position of 1.2 mm depth from its disk surface. In the case of a DVD recording layer, the recording layer is located at a position of 0.6 mm depth from its disk surface.

An operation distance of the BD optical system is set to about 0.3 mm. Therefore, if the focus search is carried out using the BD laser, even if search is carried out until the lens collides against the disk, since only reflection light of the disk surface is detected when the optical disk medium 101 is a CD or a DVD, it is possible to discriminate between BD and CD/DVD.

If the focus search is carried out using BD laser and it is found that a disk is a BD, the number of layers and kinds of disks (BD-R BD-RE and BD-ROM) are determined. When the focus search is carried out using the BD laser and a disk is determined as a CD or a DVD, focus search is carried out using CD/DVD laser, it is determined whether the disk is a CD or a DVD, a kind of the disk of DVD standards, the number of layers (DVD-R, DVD-RW, DVD+R, DVD+RW, DVD-RAM and the like), kinds of CD standards (CD-ROM, CD-R, CD-RW) are determined, and a laser circuit, a signal processing system and an internal gain which are optimal for respective disk kinds are selected.

Next, the servo is turned ON based on a circuit selection which corresponds to a kind of an optical disk medium determined in step 2, and disk information is read (step 21).

Disk information which is read, at that, time may be a minimum information for determining whether a disk is a later-described cartridge-exclusive disk. The disk information includes information such as disk kinds and the number or layers which are generally physical information sets, and information such as disk capacity and kinds of format which are logic information sets. Here, it is only necessary to read information indicating a fact that a disk medium is an optical disk medium 101 which is previously recorded in a disk and which is placed in a disk cartridge. For example, this is realized by recording distinguishing information (information recorded by removing a reflection film in a stripe shape by laser light) recorded in a BCA (Burst Cut Area) which is recorded inside of a data region and which can not be rewritten, and distinguishing information (special character string showing that a disk is an exclusive disk) which is recorded in a special region in the vicinity of an innermost periphery of a disk such as a PCA (Power Calibration Area), and reading the information.

The disk discriminating means 132 determines whether an optical disk medium 101 has a short operation distance (step 3). The operation distance differs depending upon kinds of disks and design of the optical system, but in the case of a BD whose cover layer is generally as thin as 0.1 mm and whose. NA value is large, its operation distance is designed as short as about 0.3 mm, and an operation distance of a CD and a DVD is designed relatively long as long as 0.5 to 0.6 mm. This embodiment is described on the assumption that the optical disk medium 101 is a BD having a short operation distance.

When a disk is determined as a BD having the short operation distance in step 3, the disk cartridge detecting means 130 detects whether the optical disk medium 101 is placed in the disk cartridge 203 or the optical disk medium 101 has no disk cartridge 203 (step 4). As shown in FIG. 2, the disk cartridge 203 has an outer shape larger than a range where a circular optical disk medium 101 is placed on the tray 202, it is possible to detect whether there is the disk cartridge 203 by providing the physical switch at a location outside the disk placing range on the tray 202. A state of the physical switch is detected by the CPU 127a. When the disk is placed in the disk cartridge 203, the cartridge distinguishing means 131 determines whether the disk cartridge 203 is a BD-exclusive cartridge having a short operation distance.

As shown in FIGS. 6 and 7, the lens rack 115 of the pickup 107 is generally provided with a lens protector 502 at a location higher than objective lenses 118 and 119. Each of the objective lenses 118 and 119 has a constant distance from a lens center to a periphery of the lens, and when data of an outermost periphery of a disk is read, the objective lenses 118 and 119 and the lens protector 502 protrude outside from the outermost periphery of the disk. Surfaces of the optical disk medium 101 and the turntable 104 are deviated, and to Maintain a focused state, it is necessary to control the focus driving circuit 122 and to vertically move the lens rack 115.

The disk cartridge 203 is designed for a disk of a conventional DVD-RAM standard and the disk cartridge 203 is not designed for a disk having an operation distance as short as 0.3 mm. Therefore, the disk cartridge 203 is generally provided at its location corresponding to outside of a disk outer periphery with a bridge structure 501 for reinforcing its Structure as shown in FIG. 5. Therefore, in the case of a BD placed in the disk cartridge of the DVD-RAM standard, when data is to be recorded in the vicinity of an outermost location of the optical disk medium 101 or data existing in the vicinity of an outermost location of the optical disk medium 101 is to be played back, if the surface is largely deviated, the objective lenses 118 and 119 or the lens protector 502 collide against the bridge structure 501. A necessary strength of the bridge structure 501 can not be secured only by merely thinning the bridge structure 501.

From the above reason, a bridge structure 701 is shifted in a direction separating away from the lens rack 115 as shown in FIG. 7. The tray 202 of this BD-exclusive cartridge is provided with the exclusive cartridge detecting hole for distinguishing from a disk cartridge (normal cartridge) of DVD-RAM standard. By providing a switch at a location corresponding to the exclusive cartridge detecting hole, it is possible to distinguish between the exclusive cartridge and the normal cartridge.

In this embodiment, if a switch corresponding to the exclusive cartridge detecting hole is not pressed in a state where a cartridge-presence/absence switch is pressed by the cartridge distinguishing means 131, it is determined that the disk cartridge is an exclusive cartridge. If the switch corresponding to the exclusive cartridge detecting hole is pressed in a state where a cartridge-presence/absence switch is pressed, it is determined that the disk cartridge is a normal DVD-RAM cartridge.

If it is distinguished that the BD is in a normal DVD-RAM cartridge, or even if a disk is in an exclusive cartridge, if it is determined that the disk is not an exclusive disk, since a combination of a disk and a cartridge which do not correspond to each other is used, the actuating operation stopping means 134 stops the actuating operation (step 12).

Although the embodiment has been described based on the case where the apparatus includes the cartridge distinguishing means 131 which distinguishes the BD-exclusive cartridge, but even if the apparatus does not have the cartridge distinguishing means 131, the invention can be carried out similarly. In this case, it is not possible to distinguish whether a cartridge is a BD-exclusive cartridge or a normal DVD-RAM cartridge. Therefore, if the disk discriminating means 132 determines that the BD is in a cartridge and discriminates that the disk is not a cartridge-exclusive disk, since there is a possibility that the pickup 107 is damaged, the actuating operation is stopped.

[Industrial Applicability]

According to the optical disk record and playback apparatus and the pickup protecting method thereof, it is determined whether a disk loaded onto the apparatus is the optical disk medium having a short operation distance, whether there is a disk cartridge, and whether the disk cartridge is an exclusive cartridge, thereby restricting a moving range of a pickup, and stopping an actuating operation. According to this, it is possible to avoid a case Where the pickup comes into contact with a cartridge structure and the pickup is damaged.

The invention claimed is:

1. An optical disk record and playback apparatus which can record or playback a plurality of kinds of optical disk media having different operation distances between a pickup lens and a disk surface at the time of focusing, and which can handle both an optical disk medium placed in a disk cartridge and the optical disk medium having no disk cartridge, wherein the optical disk record and playback apparatus includes
disk loading means which loads the optical disk medium onto a disk loading portion,
disk rotating means which rotates the loaded optical disk medium,
a pickup which optically reads information which is recorded in the optical disk medium,
pickup moving means which moves the pickup in a radial direction of the optical disk medium,
disk discriminating means which discriminates kinds of optical disk media,
disk cartridge detecting means which detects whether or not the optical disk medium loaded into the apparatus is placed in the disk cartridge, and
restricting means which restricts a moving range of the pickup when the disk discriminating means discriminates that the optical disk medium has a short operation distance and the disk cartridge detecting means detects that the optical disk medium is placed in the disk cartridge.

2. An optical disk record and playback apparatus which can record or playback a plurality of kinds of optical disk media having different operation distances between a pickup lens and a disk surface at the time of focusing, and which can handle both an optical disk medium placed in a disk cartridge and the optical disk medium having no disk cartridge, wherein the optical disk record and playback apparatus includes
disk loading means which loads the optical disk medium onto a disk loading portion, disk rotating means which rotates the loaded optical disk medium, a pickup which optically reads information which is recorded in the optical disk medium, pickup moving means which moves the pickup in a radial direction of the optical disk medium, disk discriminating means which discriminates kinds of optical disk media, disk cartridge detecting means which detects whether or not the optical disk medium loaded into the apparatus is placed in the disk cartridge, and actuating operation stopping means which stops an actuating operation when the disk discriminating means discriminates that the optical disk medium has a short operation distance and the disk cartridge detecting means detects that the optical disk medium is placed in the disk cartridge.

3. The optical disk record and playback apparatus according to claim 1 or 2, wherein the disk cartridge is of a DVD-RAM standard, and the optical disk medium having the short operation distance is a disk of a Blu-Ray standard.

4. The optical, disk record and playback apparatus according to claim 1, wherein the disk cartridge is of a DVD-RAM standard, and the optical disk medium having the short operation distance is a disk of a Blu-Ray standard, and the restricting means restricts the pickup not to move to a substitute region which is allocated to an outer periphery of the optical disk medium.

5. The optical disk record and playback apparatus according to claim 4, wherein the restricting means does not seek to the substitute region but returns a playback error when a playback command is included in address data of the substitute region.

6. The optical, disk record and playback apparatus according to claim 4, wherein by instructions from the restricting means, a formatting operation is carried out such that a range where movement of the pickup is restricted is included in the substitute region.

7. An optical disk record and playback apparatus which can record or playback a plurality of kinds of optical disk media having different operation distances between a pickup lens and a disk surface at the time of focusing, and which can handle both an optical disk medium placed in a disk cartridge and the optical disk medium having no disk cartridge, wherein the optical disk record and playback apparatus includes disk loading means which loads the optical disk medium onto a disk loading portion, disk rotating means which rotates the loaded optical disk medium, a pickup which optically reads information which is recorded in the optical disk medium, pickup moving means which moves the pickup in a radial direction of the optical disk medium, disk discriminating means which discriminates kinds Of optical disk media, disk cartridge detecting means which detects whether or not the optical disk medium loaded into the apparatus is placed in the disk cartridge, cartridge distinguishing means which distinguishes whether the disk cartridge is a normal cartridge with which the pickup lens or the lens protector possibly comes into contact at the time of focusing on the optical disk medium having a short operation distance, or the disk cartridge is an exclusive cartridge whose, shape is changed so such that the pickup lens or the lens protector does not come into contact with the exclusive cartridge at the time of focusing on the optical disk medium having the short operation distance, and restricting means which restricts a moving range of the pickup when the disk discriminating means discriminates that the optical disk medium has the short operation distance and the disk cartridge detecting means detects that the optical disk medium is placed in the disk cartridge and the cartridge distinguishing means distinguishes that the disk cartridge is the normal cartridge.

8. An optical disk record and playback apparatus which can record or playback a plurality of kinds of optical disk media having different operation distances between a pickup lens and a disk surface at the time of focusing, and which can handle both an optical disk medium placed in a disk cartridge and the optical disk medium having no disk cartridge, wherein the optical disk record and playback apparatus includes disk loading means which loads the optical disk medium onto a disk loading portion, disk rotating means which rotates the loaded optical disk medium, a pickup which optically reads information which is recorded in the optical disk medium, pickup moving means which moves the pickup in a radial direction of the optical disk medium, disk discriminating means which discriminates kinds of optical disk media, disk cartridge detecting means which detects whether or not the optical disk medium loaded into the apparatus is placed in the disk cartridge, cartridge distinguishing means which distinguishes whether the disk cartridge is a normal cartridge with which the pickup lens or the lens protector possibly comes into contact at the time of focusing on the optical disk medium having a short operation distance, or the disk cartridge is an exclusive cartridge whose shape is changed so such that the pickup lens or the lens protector does not come into contact with the exclusive cartridge at the time of focusing on the optical disk medium having the short operation distance, and actuating operation stopping means which stops an actuating operation when the disk discriminating means discriminates that the optical disk medium has the short operation distance and the disk cartridge detecting means detects that the optical disk medium is placed in the disk cartridge and the cartridge distinguishing means distinguishes that the disk cartridge is the normal cartridge.

9. The optical disk record and playback apparatus according to claim 7 or 8, wherein the exclusive cartridge includes an exclusive cartridge detecting hole, and the cartridge distinguishing means distinguishes between the exclusive cartridge and the normal cartridge based on presence or absence of the exclusive cartridge detecting hole.

10. The optical disk record and playback apparatus according to claim 7 or 8, wherein the cartridge distinguishing means reads distinguishing information which is recorded in a BCA (Burst Cut Area) of the optical disk medium and distinguishing information which is recorded in a PCA (Power Calibration Area) of the optical disk medium, and distinguishes between the exclusive cartridge and the normal cartridge.

11. The optical disk record and playback apparatus according to claim 10, wherein the distinguishing information includes information in which a distinguishing character string indicative of model information of a recording apparatus which records in the optical disk medium is changed to a character string which is different from a normal character string.

12. The optical disk record and playback apparatus according to claim 7 or 8, wherein the disk cartridge is of a DVD-RAM standard, and the optical disk medium having the short operation distance is a disk of a Blu-Ray standard.

13. The optical disk record and playback apparatus according to claim 7, wherein the disk cartridge is of a DVD-RAM standard, and the optical disk medium having the short operation distance is a disk of a Blu-Ray standard, and
the restricting means restricts the pickup not to move to a substitute region which is allocated to an outer periphery of the optical disk medium.

14. The optical disk record and playback apparatus according to claim 13, wherein by instructions from the restricting means, a formatting operation is carried out such that a range where movement of the pickup is restricted is included in the substitute region.

15. A pickup protecting method of an optical disk record and playback apparatus which can record or playback a plurality of kinds of optical disk media having different operation distances between a pickup lens and a disk surface at the time of focusing, and which can handle both an optical, disk medium placed in a disk cartridge and the optical disk medium having no disk cartridge, the method comprising
a step of loading the optical disk medium onto a disk loading portion,
a step of rotating the loaded optical disk medium,
a step of discriminating kinds of the optical disk media,
a step of detecting whether or not the optical disk medium loaded into the apparatus is placed in the disk cartridge, and
a step of restricting a moving range of a pickup which optically reads information which is recorded in the optical disk medium when it is discriminated that the optical disk medium has a short operation distance and it is detected that the optical disk medium is placed in the disk cartridge.

16. A pickup protecting method of an optical disk record and playback apparatus which can record or playback a plurality of kinds of optical disk media having different operation distances between a pickup lens and a disk surface at the time of focusing, and which can handle both an optical disk medium placed in a disk cartridge and the optical disk medium having no disk cartridge, the method comprising
a step of loading the optical disk medium onto a disk loading portion,
a step of rotating the loaded optical disk medium,
a step of discriminating kinds of the optical disk media,
a step of detecting whether or not the optical disk medium loaded into the apparatus is placed in the disk cartridge, and
a step of stopping an actuating operation when it is discriminated that the optical disk medium has a short operation distance and it is detected that the optical, disk medium is placed in the disk cartridge.

17. The pickup protecting method of the optical disk record and playback apparatus according to claim 15 or 16, wherein the disk cartridge is of a DVD-RAM standard, and the optical disk medium having the short operation, distance is a disk of a Blu-Ray standard.

18. The pickup protecting method of the optical disk record and playback apparatus according to claim 15, wherein the disk cartridge is of a DVD-RAM standard, and the optical disk medium having the short operation distance is a disk of a Blu-Ray standard, and
the method further comprises a step of restricting the pickup not to move to a substitute region which is allocated to an outer periphery of the optical disk medium.

19. The pickup protecting method of the optical disk record and playback apparatus according to claim 18, wherein further comprising a step of not seeking the substitute region and but returning a playback error when a playback command is included in address data of the substitute region.

20. The pickup protecting method of the optical disk record and playback apparatus according to claim 18, further comprising a step of carrying out a formatting operation such that a range where movement of the pickup is restricted is included in the substitute region.

21. A pickup protecting method of an optical disk record and playback apparatus which can record or playback a plurality of kinds of optical disk media having different operation distances between a pickup lens and a disk surface at the time of focusing, and which can handle both an optical disk medium placed in a disk cartridge and the optical disk medium having no disk cartridge, the method comprising
a step of loading the optical disk medium onto a disk loading portion,
a step of rotating the loaded optical disk medium,
a step of discriminating kinds of the optical disk media,
a step of detecting whether or not the optical disk medium loaded into the apparatus is placed in the disk cartridge,
a step of distinguishing whether the disk cartridge is a normal cartridge with which the pickup lens or the lens protector possibly comes into contact at the time of focusing on the optical disk medium having a short operation distance, or the disk cartridge is an exclusive cartridge whose shape is changed so such that the pickup lens or the lens protector does not come into contact with the exclusive cartridge at the time of focusing on the optical disk medium having the short operation distance, and
a step of restricting a moving range of a pickup which optically reads information which is recorded in the optical disk medium when it is discriminated that the optical disk medium has the short operation distance and it is detected that the optical disk medium is placed in the disk cartridge.

22. A pickup protecting method of an optical disk record and playback apparatus which can record or playback a plurality of kinds of optical disk media having different operation distances between a pickup lens and a disk surface at the time of focusing, and which can, handle both an optical disk medium placed in a disk cartridge and the optical disk medium having no disk cartridge, the method comprising
a step of loading the, optical disk medium onto a disk loading portion,
a step of rotating the loaded optical disk medium,
a step of discriminating kinds of the optical disk media,
a step of detecting whether or not the Optical disk medium loaded into the apparatus is placed in the disk cartridge,
a step of distinguishing whether the disk cartridge is a normal cartridge with which the pickup lens or the lens protector possibly comes into contact at the time of focusing on the optical disk medium having a short operation distance, or the disk cartridge is an exclusive cartridge whose shape is changed so such that the pickup lens or the lens protector does not come into contact with the exclusive cartridge at the time of focusing on the optical disk medium having the short operation distance, and
a step of stopping an actuating operation when it is discriminated that the optical disk medium has the short operation distance and it is detected that the optical disk medium is placed in the disk cartridge and it is distinguished that the disk cartridge is a normal cartridge.

23. The pickup protecting method of the optical disk record and playback apparatus according to claim 21 or 22, wherein the exclusive cartridge includes an exclusive cartridge detecting hole, and the method further comprises a step of distinguishing between the exclusive cartridge and the normal cartridge based on presence or absence of the exclusive cartridge detecting hole by the cartridge distinguishing means.

24. The pickup protecting method of the optical disk record and playback apparatus according to claim 21 or 22, further comprising a step of reading distinguishing information which is recorded in a BCA (Burst Out Area) of the optical disk medium and distinguishing information which is recorded in a PCA (Power Calibration Area) of the optical disk medium, and distinguishing between the exclusive cartridge and the normal cartridge by the cartridge distinguishing means.

25. The pickup protecting method of the optical disk record and playback apparatus according to claim 24, wherein the distinguishing information includes information in which a distinguishing character string indicative of model information of a recording apparatus which records in the optical disk medium is changed to a character string which is different from a normal character string.

26. The pickup protecting method of the optical disk record and playback apparatus according to claim 21 or 22, wherein the disk cartridge is of a DVD-RAM standard, and the optical disk medium having the short operation distance is a disk of a Blu-Ray standard.

27. The pickup protecting method of the optical disk record and playback apparatus according to claim 21, wherein the disk cartridge is of a DVD-RAM standard, and the optical disk medium having the short operation distance is a disk of a Blu-Ray standard, and in the step of restricting the moving range of the pickup, the pickup is restricted not to move to a substitute region which is allocated to an outer periphery of the optical disk medium.

28. The pickup protecting method of the optical disk record and playback apparatus according to claim 27, wherein a formatting operation is carried out Such that a range where movement of the pickup is restricted is included in the substitute region.

* * * * *